(12) United States Patent
Bouzguarrou et al.

(10) Patent No.: US 10,990,543 B1
(45) Date of Patent: Apr. 27, 2021

(54) APPARATUS AND METHOD FOR ARBITRATING ACCESS TO A SET OF RESOURCES

(71) Applicant: Arm Limited, Cambridge (GB)

(72) Inventors: Houdhaifa Bouzguarrou, Valbonne (FR); Damien Guillaume Pierre Payet, Antibes (FR); Hugo Décharnes, Valbonne (FR); Maxime Jean Carlo Philippe, Le Rouret (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/732,643

(22) Filed: Jan. 2, 2020

(51) Int. Cl.
*G06F 13/16* (2006.01)
*G06F 16/901* (2019.01)
(Continued)

(52) U.S. Cl.
CPC .......... *G06F 13/161* (2013.01); *G06F 9/3816* (2013.01); *G06F 9/5038* (2013.01); *G06F 13/1642* (2013.01); *G06F 16/9017* (2019.01)

(58) Field of Classification Search
CPC .. G06F 13/161; G06F 13/1642; G06F 9/3816; G06F 9/5038; G06F 16/9017
See application file for complete search history.

(56) References Cited

U.S. PATENT DOCUMENTS

2005/0204085 A1* 9/2005 Fukuyama ............ G06F 13/161
710/244

2007/0016709 A1* 1/2007 Kazama ................ G06F 13/364
710/113
(Continued)

*Primary Examiner* — Nimesh G Patel
(74) *Attorney, Agent, or Firm* — Nixon & Vanderhye P.C.

(57) ABSTRACT

An apparatus and method are provided for arbitrating access to a set of resources that are to be accessed in response to requests received at an interface. Arbitration circuitry arbitrates amongst the requests received at the interface in order to select, in each arbitration cycle, at least one next request to be processed. Each request identifies an access operation to be performed in response to the request, the access operation being selected from a group of access operations. Further, each access operation in the group has an associated scheduling pattern identifying timing of access to the resources in the set when performing that access operation. In response to a given request being selected by the arbitration circuitry, access control circuitry controls access to the set of resources in accordance with the associated scheduling pattern for the access operation identified by that request. Ordering circuitry determines, for different combinations of requests, an associated ordering of those requests, where the associated ordering is determined taking into account the associated scheduling pattern of each access operation in the group. The arbitration circuitry may employ a bandwidth aware arbitration scheme where a multi-arbitration operation is iteratively performed. Each performance of the multi-arbitration operation comprises sampling the requests currently received at the interface, and employing the ordering circuitry to determine, based on the sampled requests, an order in which the sampled requests should be selected. Then, during each arbitration cycle, at least one next request to be processed is selected from amongst the sampled requests based on the determined order, until each sampled request has been selected.

22 Claims, 14 Drawing Sheets

(51) Int. Cl.
    *G06F 9/38*         (2018.01)
    *G06F 9/50*         (2006.01)

(56) References Cited

U.S. PATENT DOCUMENTS

2018/0173649 A1*   6/2018   Kyrychynskyi ...... G06F 13/161
2019/0324757 A1*  10/2019   Valerio ................ G06F 9/3851
2019/0332440 A1*  10/2019   Smaldone ........... H04L 43/0876
2020/0026674 A1*   1/2020   Tune .................... G06F 13/366

* cited by examiner

|      | M1 | M2 | M3 | M4 | M5 | M6 | M7 | M8 |
|------|----|----|----|----|----|----|----|----|
| SF   |    | R  |    |    |    |    |    |    |
| Tag  |    | R  |    |    | W  |    |    |    |
| Repl |    | R  |    |    | W  |    |    |    |
| Data |    |    |    | R1 | R2 |    |    |    |

READ

FIG. 3A

|      | M1 | M2 | M3 | M4 | M5 | M6 | M7 | M8 |
|------|----|----|----|----|----|----|----|----|
| SF   |    |    |    |    | R  |    |    |    |
| Tag  |    |    |    |    | R  |    |    | W  |
| Repl |    | R  |    |    |    | W  |    |    |
| Data |    |    |    |    | R1 | R2 | W1 | W2 |

Alloc

FIG. 3B

|      | M1 | M2 | M3 | M4 | M5 | M6 | M7 | M8 |
|------|----|----|----|----|----|----|----|----|
| SF   |    | R  |    |    |    |    |    |    |
| Tag  |    | R  |    |    | W  |    |    |    |
| Repl |    |    |    |    | W  |    |    |    |
| Data |    |    |    |    |    |    |    |    |

Stream

FIG. 3C

|      | M1 | M2 | M3 | M4 | M5 | M6 | M7 | M8 |
|------|----|----|----|----|----|----|----|----|
| SF   |    | R  |    |    |    |    |    |    |
| Tag  |    | R  |    |    |    |    |    |    |
| Repl |    |    |    |    |    |    |    |    |
| Data |    |    |    |    |    |    |    |    |

Prefetch

FIG. 3D

Example of scheduling

[READ_SNOOP, PREFETCH, STREAM_LOOKUP, ALLOC, PREFETCH]

Random Scheduling: 11 cycles

FIG. 8A

Optimized Scheduling: offline exploration 9 cycles

FIG. 8B

APPARATUS AND METHOD FOR ARBITRATING ACCESS TO A SET OF RESOURCES

BACKGROUND

The present technique relates to an apparatus and method for arbitrating access to a set of resources.

A device within a system may be arranged to have an interface for receiving requests from other entities within the system. The device may have a set of resources that are accessed in response to the requests. Each request may identify an access operation to be performed, and exactly which resources within the set of resources need to be accessed, and the order in which those resources need to be accessed, will depend on the access operation specified by that request.

Arbitration circuitry will typically be provided to arbitrate between the various requests received at the interface. Once a given request has been selected, then performance of its associated access operation will cause resources from the set of resources to be accessed over a number of clock cycles. This can cause some issues in subsequent arbitration cycles, since it may be the case that in some instances none of the requests pending at the interface can be selected in a particular arbitration cycle, since selection of such a request would cause contention for access to one or more of the resources.

In some situations, this may not be problematic, since it may be the case that the arbitration circuitry is merely seeking to select higher priority requests in favour of lower priority requests, so as to reduce the latency of those higher priority requests, and is not concerned with the overall throughput of requests. However, in some instances there are workloads that need to be performed within the system that require a high sustainable bandwidth, and hence the series of requests defining such a workload would desirably be handled in a manner which reduced any wasted cycles where requests could not be selected by the arbitration circuitry. It would hence be desirable to provide an arbitration scheme that allows for the bandwidth to be improved, i.e. for the volume of requests that can be handled in a given time to be improved.

SUMMARY

In a first example configuration, there is provided an apparatus comprising: an interface to receive requests; a set of resources to be accessed in response to the requests; arbitration circuitry to arbitrate amongst the requests received at the interface in order to select, in each arbitration cycle, at least one next request to be processed, wherein each request identifies an access operation to be performed in response to the request, the access operation being selected from a group of access operations, and wherein each access operation in the group has an associated scheduling pattern identifying timing of access to the resources in the set when performing that access operation; access control circuitry, responsive to a given request being selected by the arbitration circuitry, to control access to the set of resources in accordance with the associated scheduling pattern for the access operation identified by that given request; and ordering circuitry to determine, for different combinations of requests, an associated ordering of those requests, where the associated ordering is determined taking into account the associated scheduling pattern of each access operation in the group; wherein, at least in the presence of a trigger condition, the arbitration circuitry is arranged to employ a bandwidth aware arbitration scheme where the arbitration circuitry is arranged to iteratively perform a multi-arbitration operation, where each performance of the multi-arbitration operation comprises: sampling the requests currently received at the interface; employing the ordering circuitry to determine, based on the sampled requests, an order in which the sampled requests should be selected; and during each arbitration cycle, selecting the at least one next request to be processed from amongst the sampled requests, based on the determined order, until each sampled request has been selected.

In another example configuration, there is provided a lookup table generation apparatus to generate a lookup table for use as ordering circuitry within an apparatus in accordance with the first example configuration, the lookup table generation apparatus comprising: an input interface to receive at least an indication of each possible combination of requests that may be received at the same time by an apparatus arranged in accordance with the first example configuration; storage to identify an associated scheduling pattern for each access operation that may be identified by a request, wherein for each access operation the associated scheduling pattern identifies timing of access to resources in a set of resources provided by an apparatus arranged in accordance with the first example configuration when performing that access operation; and optimization circuitry to analyse each possible combination of requests, taking into account the associated scheduling patterns of the access operations identified by those requests, in order to determine an associated ordering of those requests to be identified in the lookup table.

In a third example configuration, there is provided a method of operating an apparatus to arbitrate access to a set of resources, comprising: receiving at an interface requests for access to the set of resources; employing arbitration circuitry to arbitrate amongst the requests received at the interface in order to select, in each arbitration cycle, at least one next request to be processed, wherein each request identifies an access operation to be performed in response to the request, the access operation being selected from a group of access operations, and wherein each access operation in the group has an associated scheduling pattern identifying timing of access to the resources in the set when performing that access operation; controlling, responsive to a given request being selected by the arbitration circuitry, access to the set of resources in accordance with the associated scheduling pattern for the access operation identified by that given request; and employing ordering circuitry to determine, for different combinations of requests, an associated ordering of those requests, where the associated ordering is determined taking into account the associated scheduling pattern of each access operation in the group; at least in the presence of a trigger condition, causing the arbitration circuitry to employ a bandwidth aware arbitration scheme where the arbitration circuitry is arranged to iteratively perform a multi-arbitration operation, where each performance of the multi-arbitration operation comprises: sampling the requests currently received at the interface; employing the ordering circuitry to determine, based on the sampled requests, an order in which the sampled requests should be selected; and during each arbitration cycle, selecting the at least one next request to be processed from amongst the sampled requests, based on the determined order, until each sampled request has been selected.

In a still further example configuration, there is provided an apparatus comprising: interface means for receiving requests; a set of resources to be accessed in response to the requests; arbitration means for arbitrating amongst the requests received at the interface means in order to select, in each arbitration cycle, at least one next request to be processed, wherein each request identifies an access operation to be performed in response to the request, the access operation being selected from a group of access operations, and wherein each access operation in the group has an associated scheduling pattern identifying timing of access to the resources in the set when performing that access operation; access control means, responsive to a given request being selected by the arbitration means, for controlling access to the set of resources in accordance with the associated scheduling pattern for the access operation identified by that given request; and ordering means for determining, for different combinations of requests, an associated ordering of those requests, where the associated ordering is determined taking into account the associated scheduling pattern of each access operation in the group; wherein, at least in the presence of a trigger condition, the arbitration means for employing a bandwidth aware arbitration scheme where the arbitration means iteratively performs a multi-arbitration operation, where each performance of the multi-arbitration operation comprises: sampling the requests currently received at the interface means; employing the ordering means to determine, based on the sampled requests, an order in which the sampled requests should be selected; and during each arbitration cycle, selecting the at least one next request to be processed from amongst the sampled requests, based on the determined order, until each sampled request has been selected.

BRIEF DESCRIPTION OF THE DRAWINGS

The present technique will be described further, by way of illustration only, with reference to examples thereof as illustrated in the accompanying drawings, in which:

FIGS. 3A to 3D illustrate scheduling patterns identifying the timing of access to the various resources of the level 2 cache for different types of access operation, in accordance with one specific implementation;

FIGS. 8A and 8B illustrate the bandwidth improvement that may be realised when employing the bandwidth aware arbitration policy, for one specific example group of requests presented to the interface of the level 2 cache;

DESCRIPTION OF EXAMPLES

Figure 1:
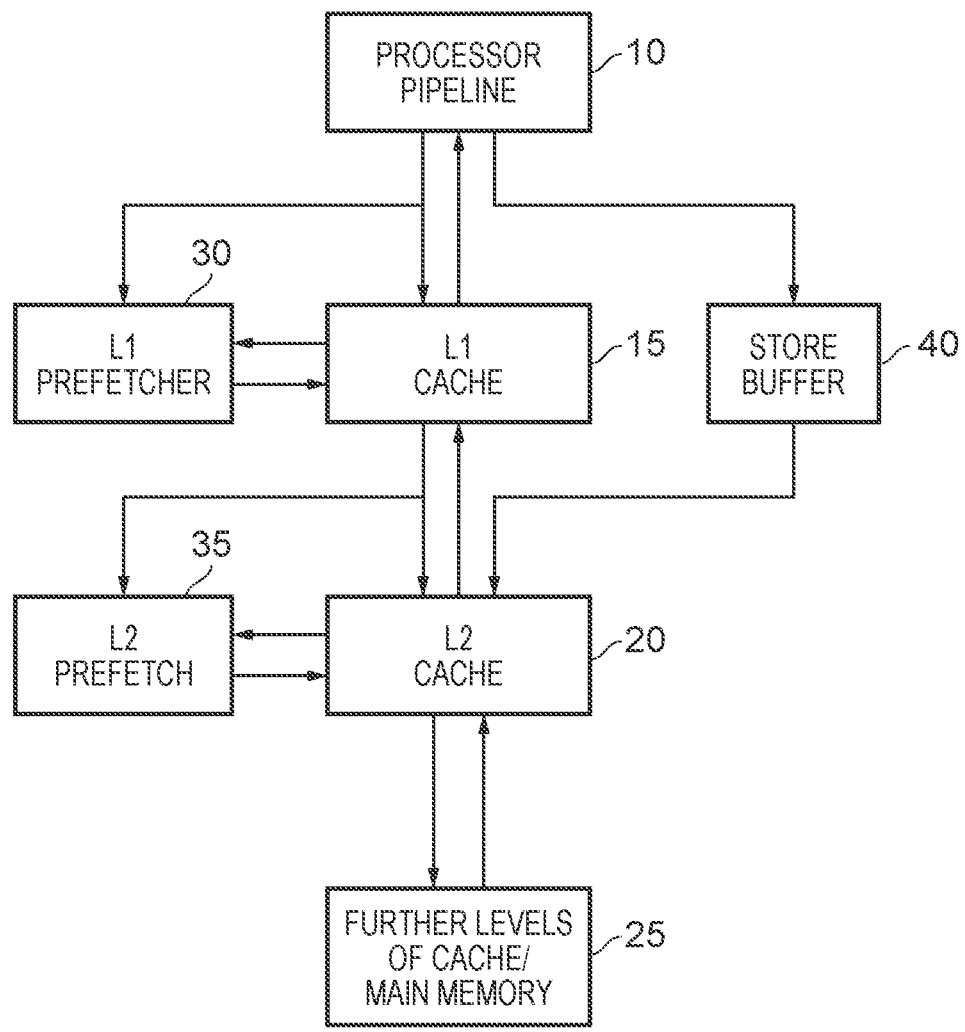
FIG. 1 is a block diagram of a system in accordance with one example implementation.

In accordance with one example arrangement, an apparatus is provided that has an interface for receiving requests, and a set of resources to be accessed in response to those requests. Arbitration circuitry is provided to arbitrate amongst the requests received at the interface in order to select, in each arbitration cycle, at least one next request to be processed. Each request identifies an access operation to be performed in response to the request, where the access operation is selected from a group of available access operations. Further, each access operation in the group has an associated scheduling pattern identifying timing of access to the resources in the set when performing that access operation. For any given request, the access operation to be performed may be implicit, for example by the type of request, or the request may explicitly identify the access operation to be performed.

Access control circuitry is arranged to be responsive to a given request being selected by the arbitration circuitry, to control access to the set of resources in accordance with the associated scheduling pattern for the access operation identified by that given request.

Further, in accordance with the techniques described herein, ordering circuitry is provided to determine, for different combinations of requests, an associated ordering of those requests, where the associated ordering is determined taking into account the associated scheduling pattern of each access operation in the group. The arbitration circuitry can then be arranged to employ a bandwidth aware arbitration scheme that takes into account information provided by the ordering circuitry. The arbitration circuitry may be arranged to always employ the bandwidth aware arbitration scheme, or alternatively may be arranged to employ the bandwidth aware arbitration scheme when a trigger condition is determined to be present.

When performing the bandwidth aware arbitration scheme, the arbitration circuitry is arranged to iteratively perform a multi-arbitration operation. Each performance of the multi-arbitration operation comprises sampling the requests currently received at the interface, and then employing the ordering circuitry to determine, based on the sampled requests, an order in which the sampled requests should be selected. Then, during each arbitration cycle, at least one next request is selected to be processed from amongst the sampled requests, based on the determined order, until each sampled request has been selected. Only when each of the sampled requests has been selected will the next iteration of the multi-arbitration operation be performed, and accordingly only once each of the sampled requests has been selected will another sampling of the requests being received at the interface then be made.

Hence, in contrast to a typical arbitration scheme which would, in each arbitration cycle, sample the requests at the interface and then select at least one of those requests, in accordance with the bandwidth aware arbitration scheme a snapshot of the requests being received at the interface at the start of the multi-arbitration operation is taken, and then an ordering in which those requests are going to be selected is determined with reference to the ordering circuitry. Thereafter, in each arbitration cycle, one or more of those requests is processed, until after a certain number of arbitration cycles each of the sampled requests has been selected, and only then are the requests at the interface resampled.

This allows a highly bandwidth optimised ordering of the requests to be achieved. In particular, the ordering circuitry can be arranged, for each possible combination of requests that could be presented at the interface, to determine an optimal ordering for those requests taking into account the scheduling patterns associated with the access operations defined by those requests. This analysis can be performed offline if desired, in which case the ordering circuitry could take the form of a lookup table whose contents have been populated based on that offline analysis.

As a result, the prospect of wasted arbitration cycles can be significantly reduced, and hence the overall bandwidth of the apparatus can be improved relative to the earlier-mentioned known arbitration schemes that merely resample the access requests present at the interface during each arbitration cycle and then seek to apply an arbitration policy to select a request from amongst those requests. In particular, since in accordance with the bandwidth aware arbitration scheme described herein a snapshot of the requests at a particular point in time is taken, and then all of those requests are selected over a series of arbitration cycles before any other requests are considered by the arbitration circuitry, it is possible to take into account the scheduling patterns associated with the access operations defined by those various requests so as to seek to achieve the optimal scheduling of that group of requests, i.e. the scheduling that minimises contention for access to the various resources in the set of resources, and hence minimises the wasted cycles.

The scheduling patterns can take a variety of forms. However, in one example implementation at least one of the access operations in the group takes multiple clock cycles to perform, and the associated scheduling pattern identifies, for each clock cycle in the multiple clock cycles, which resources in the set are accessed in that clock cycle when performing the access operation. Hence, based on the scheduling pattern, the ordering circuitry knows on a clock cycle by cycle basis which resources will be accessed once a specific request has been selected by the arbitration circuitry. Hence, during any given multi-arbitration operation, the ordering circuitry can provide an optimised order in which the sampled requests should be selected, using the clock cycle by clock cycle knowledge of the resources that will need to be accessed for each access operation, so as to reduce the contention for access, and hence ensure that that group of requests are processed in the most bandwidth efficient manner.

As mentioned earlier, in one example implementation the arbitration circuitry may be arranged to always employ the bandwidth aware arbitration scheme. However, in an alternative implementation, in an absence of the trigger condition the arbitration circuitry is arranged to employ a default arbitration scheme that, on each arbitration cycle, selects a request from amongst the requests currently received at the interface in that arbitration cycle. It can be beneficial to allow the arbitration circuitry to switch between the bandwidth aware arbitration scheme and at least one other arbitration scheme, since whilst in some instances it may be desirable to achieve maximum bandwidth, in other instances this may not be the key requirement, and it may for instance be necessary for the latency of certain requests to be reduced.

For example, priorities may be associated with different requests, and it may be necessary to ensure that the higher priority requests are handled within a particular timeframe. Hence, under such conditions it may be more appropriate to employ a latency aware arbitration scheme rather than the bandwidth aware arbitration scheme. Thus, the earlier-mentioned default arbitration scheme may be arranged to take into account priority information associated with each request, in order to implement a latency aware arbitration scheme. Hence, on each arbitration cycle, when the default arbitration scheme is used the arbitration circuitry may be arranged to review the currently active requests being presented at the interface, and select a request from amongst those requests taking into account the priority information of the various active requests.

As mentioned earlier, the ordering circuitry that is used when the bandwidth aware arbitration scheme is being employed may be arranged to provide an associated ordering of requests for each of the possible different combinations of requests that may be presented at the interface. However, in one example implementation, the ordering circuitry also takes into account additional information about one or more inflight requests. In particular, the ordering circuitry may be arranged to determine, for a given combination of requests, an associated ordering of those requests that also takes into account one or more inflight requests recently selected by the arbitration circuitry. The arbitration circuitry may then be arranged, when performing the multi-arbitration operation, to provide the ordering circuitry with an indication of the sampled requests and of the one or more inflight requests recently selected by the arbitration circuitry, to enable the ordering circuitry to determine the order in which the sampled requests should be selected. In particular, as mentioned earlier, for at least some requests the associated access operation may take multiple clock cycles to perform, and as a result various of the resources will be accessed during the course of those multiple clock cycles. Hence, it is desirable for the ordering circuitry to take into account not only the particular combination of requests that are now presented at the interface at the start of the multi-arbitration operation, but also any inflight requests that could cause contention for access to the resources depending on the order in which the requests currently received at the interface are selected.

Hence, in one example implementation, the ordering circuitry is arranged to take into account the one or more inflight requests by identifying each inflight request amongst said one or more inflight requests that, taking into account the time of that inflight request's selection and the associated scheduling pattern for the access operation identified by that inflight request, has the prospect of causing contention for access to the resources when taking into account the sampled requests, and to determine as the associated ordering an ordering amongst the sampled requests that avoids said contention. It will be appreciated that the potential for an inflight request to result in any contention in access to the resources will depend on the access operation associated with that inflight request, and hence the associated scheduling pattern, and also how many clock cycles previously that inflight request was selected, which will dictate how far through the inflight request's access operation is by the time any request in the currently sampled set at the start of the multi-arbitration operation is selected by the arbitration circuitry.

In practice it has been found that not all inflight requests need to be considered, and hence in one example implementation the arbitration circuitry may be arranged to provide the ordering circuitry with an indication of the one or more inflight requests selected by the arbitration circuitry in just a predetermined number of preceding arbitration cycles. Whilst there may still be one or more inflight requests that were arbitrated before that predetermined number of preceding arbitration cycles, it may be known that there is no prospect of the handling of those requests causing contention for access to resources when considering how to arbitrate amongst the various requests sampled at the interface at the start of a current multi-arbitration operation.

In one example implementation the apparatus further comprises trigger condition detection circuitry to determine when the trigger condition is present, in dependence on monitoring of the requests being received at the interface over a period of time.

There are a number of ways in which the trigger condition detection circuitry may monitor the request being received at the interface over a period of time. For example, in one implementation the trigger condition detection circuitry may be arranged to maintain at least one counter whose value is adjusted based on occurrence of determined events detected by the monitoring of the requests being received at the interface. The determined events can take a variety of forms, but in one example implementation comprise one or more events indicating that processing of the requests is likely to be bandwidth constrained. For example, such an event may be a situation where a relatively large number of requests are presented simultaneously to the interface, since this may be indicative of a situation where it is desirable to improve throughput rather than using a default arbitration scheme that might for example seek to reduce latency of high priority requests.

As a more complex example, the determined event may be associated with observation of a predetermined pattern of requests. In particular, as mentioned earlier, there may be certain types of workload where a high sustainable bandwidth is required, and such workloads may be indicated by particular patterns of requests that may for example be repetitively performed. As an example, a memory copy (memcopy) workload may seek to move blocks of data from one location in memory to another location in memory, and may be implemented by a repeated series of requests of different types, and if that pattern can be detected this can be used to indicate a situation where it would be appropriate to switch to the bandwidth aware arbitration scheme. Similarly, there may be certain patterns of requests that may indicate that latency is more important than bandwidth, and could be used to trigger a switching to the default arbitration scheme.

In one example implementation, the trigger condition detection circuitry is arranged to maintain a counter whose value is adjusted in a first direction when a number of requests received at the interface in a current arbitration cycle is greater than or equal to a predetermined number and is adjusted in a second direction opposite to the first direction when the number of requests received at the interface in the current arbitration cycle is less than the predetermined number. The trigger condition detection circuitry may then be arranged to detect presence of the trigger condition in dependence on whether the value of the counter is beyond a threshold value. Hence, by way of example, such a counter could be incremented when the number of requests is greater than or equal to the predetermined number and may be decremented when the number of requests is less than the predetermined number. If desired, to avoid too frequent a switching between the different arbitration schemes when the counter value is close to the predetermined number, it may be arranged that following a switch in either direction, the counter is not reviewed again for a certain number of arbitration cycles, so that during that period the arbitration scheme remains the same irrespective of how the counter varies in the interim.

As an alternative to the above approach, or in addition, the trigger condition detection circuitry may be arranged whilst the trigger condition is absent, and hence the bandwidth aware arbitration scheme is not being used, to make reference to the ordering circuitry so as to seek to compare the actual number of wasted cycles observed with the corresponding wasted cycles that would have occurred had the bandwidth aware arbitration scheme been used.

In particular, in one example implementation, in the absence of the trigger condition being present, the trigger condition detection circuitry is arranged to monitor an actual number of wasted cycles observed as a result of a sequence of requests selected by the arbitration circuitry, to determine with reference to the ordering circuitry a reference number of wasted cycles that would have arisen had that sequence of requests been ordered according to the associated ordering output by the ordering circuitry, and to maintain a wasted cycles indication counter whose value is adjusted in a first direction when the actual number of wasted cycles exceeds the reference number of wasted cycles and is adjusted in a second direction opposite to the first direction when the actual number of wasted cycles is less than the reference number of wasted cycles. The trigger condition detection circuitry may then be arranged to detect presence of the trigger condition in dependence on whether the value of the wasted cycles indication counter is beyond a wasted cycles indication threshold value. The trigger condition detection circuitry could be arranged to perform such monitoring on an ongoing basis, and effectively reference the ordering circuitry on a continuous basis, or instead could perform the check with respect to the ordering circuitry at discrete points in time.

When adopting the above-described monitoring mechanism to determine at which point it is appropriate to trigger switching to the bandwidth aware arbitration scheme, a number of different mechanisms could be used to enable a switch back to the default arbitration scheme. For example, the earlier-mentioned counter that keeps track of the number of requests received at the interface could still be used in addition, and may in due course cause a switch back to the default arbitration scheme. As another example, a device within the system that is generating at least some of the requests may be able to generate a control signal that is set when that device wishes the apparatus to employ the default arbitration scheme. Hence, in situations where such a requesting device is observing that some of its high priority requests are not being handled quickly enough, or that there is a prospect that such a situation may arise, it may assert such a control signal, which thereby will ensure that the apparatus thereafter operates using the default arbitration scheme. It should be noted that the requester device does not need to know whether the apparatus is using the bandwidth aware arbitration scheme or the default arbitration scheme, but the control signal will merely ensure that following assertion of that control signal the apparatus does use the default arbitration scheme for at least a predetermined period of time.

The set of resources can take a variety of forms, but in one example are components provided within a cache storage. In one such implementation, the cache storage may be provided within a cache hierarchy, and the requests are received from multiple different sources including at least one further cache storage at a higher level in the cache hierarchy.

The set of resources within such a cache storage can take a variety of forms, but in one example the set of resources comprise at least a data storage comprising a plurality of cache lines used to store data values, and a tag storage comprising a plurality of entries, where each entry is used to store an address indication indicative of a common address portion for the data values stored in a corresponding cache line of the data storage. However, the set of resources may also include other components. For example the set of resources may further comprise snoop circuitry used to process a snoop request to determine which caches within a cache hierarchy should be subjected to a snoop operation, the cache hierarchy including the cache storage, and/or a replacement policy storage to identify, for each cache line, replacement information referenced during application of a replacement policy to select a cache line whose contents are to be evicted from the cache storage.

As a specific example use case of the snoop circuitry, the cache storage that incorporates the techniques described herein may be a level 2 cache that operates using physical addresses. However, a level 1 cache provided as a higher level in the cache hierarchy may be indexed using a virtual address, and in particular may be virtually indexed but physically tagged. In such a system, it is possible that the level 1 cache may detect a miss when performing a lookup for a particular data item, when in fact that data is stored within the cache, but at a different location. Such a situation can be detected by the snoop circuitry within the level 2 cache, at which point the correct index information can be provided back to the level 1 cache to enable it to perform a lookup within its cache in order to obtain the data. That cache line may at that time be invalidated and the data evicted back to the level 2 cache, enabling the level 2 cache to then issue an allocation request back to the level 1 cache to cause the data to be allocated in the cache line associated with the originally used index that resulted in the miss. This will ensure that if the level 1 cache then subsequently seeks to access the data again using the same virtual index, it will that time obtain a hit.

There are a number of ways in which the arbitration circuitry can mark the sampled requests so that they are selected in the order determined by the ordering circuitry. However, in one example arrangement the arbitration circuitry is arranged, when performing the multi-arbitration operation, to allocate a ticket number to each sampled request to identify the determined order of the sampled requests, and during each arbitration cycle, to use the ticket number to select the at least one next request to be processed from amongst the sampled requests. This provides a simple and effective mechanism for ensuring that, over multiple arbitration cycles, the requests are selected in the order indicated by the ordering circuitry.

As mentioned earlier, the ordering circuitry can take a variety of forms. For example, it may be implemented by logic that generates the required ordering on the fly based on input information about the currently sampled requests. However, as mentioned earlier, the analysis could be performed offline and used to populate a lookup table that is then used as the ordering circuitry. In one example implementation, a lookup table generation apparatus can hence be provided to generate a lookup table for use as ordering circuitry within an apparatus as described above. That lookup table generation apparatus may for example comprise an input interface to receive at least an indication of each possible combination of requests that may be received at the same time by the earlier mentioned apparatus, for example a cache. Further, the lookup table generation apparatus may provide storage that is used to identify an associated scheduling pattern for each access operation that may be identified by a request, wherein for each access operation the associated scheduling pattern identifies timing of access to resources in the set of resources provided by the above-mentioned apparatus when performing that access operation. Further, the lookup table generation apparatus may include optimisation circuitry to analyse each possible combination of requests, taking into account the associated scheduling patterns of the access operations identified by those requests, in order to determine an associated ordering of those requests to be identified in the lookup table. By such an approach, then at the time the ordering circuitry is used, it is merely necessary to generate an input index to the lookup table based on the sampled requests at the start of the multi-arbitration operation, and this will identify an entry within the lookup table that indicates the required ordering of those requests.

In one example implementation, the lookup table is arranged to provide, for each combination of requests, multiple associated orderings of those requests, where each associated ordering of those requests takes into account a different combination of inflight requests. The optimization circuitry is then arranged, when determining an associated ordering for a given combination of requests, to consider each inflight request that, taking into account a relative timing of that inflight request's selection and the associated scheduling pattern for the access operation identified by that inflight request, has the prospect of causing contention for access to the set of resources when taking into account the given combination of requests, with the optimization circuitry being arranged to determine the associated ordering for the given combination of requests so as to avoid said contention. Hence, by such an approach, the lookup table can be expanded so as to take into account the effects of various inflight request. As a result, a combination of information about the requests currently received at the interface at the start of the multi-arbitration operation, and the inflight requests arbitrated in a number of previous arbitration cycles, can be used to collectively generate an input into the lookup table to identify the appropriate entry that will then specify the required ordering for the sampled requests taking into account the indicated inflight requests. This hence enables an optimised ordering to be indicated, taking into account not only the potential contention that could arise amongst the currently sampled requests, but also any contention that could arise due to the inflight requests.

Particular examples will now be described with reference to the Figures.

FIG. 1 is a block diagram of a system in accordance with one example implementation. As shown, a processor pipeline 10 may be provided that is arranged to execute a sequence of instructions in order to perform data processing operations. The instructions to be executed, and the data manipulated by those instructions, may be stored within a memory system. A cache hierarchy may be provided as part of the memory system to improve speed of access to such instructions and data. At certain levels in the cache, for example at the level 1 cache level, separate caches may be provided for instructions and data, whereas at lower levels within the cache hierarchy, for example at the level 2 cache, a unified cache structure may be used to store both instructions and data. For the purposes of the following discussion, the handling of accesses to data will be considered, but in principle the same techniques can also be applied in association with instructions.

Hence in FIG. 1, when the processor pipeline 10 issues a request to access data, that request may first be received by the level 1 cache 15, and if the data is present in the level 1 cache that request may be processed using the data as cached in the level 1 cache. However, if a miss occurs in the level 1 cache, the request can be propagated onto the level 2 cache 20, where a lookup can then be performed to see if the data is resident within the level 2 cache. If so, the access can be processed with reference to the data stored in the level 2 cache, but in the event of a level 2 cache miss the request can be propagated onto any further levels of cache and ultimately onto main memory 25.

If the data that needs to be accessed is resident within the cache hierarchy, then this can significantly increase performance, since there is no need to access main memory to obtain the data. In order to seek to increase the likelihood that the requested data will be in the cache by the time it is requested by the processing pipeline 10, prefetcher circuits can be associated with one or more of the levels of cache. In the example shown in FIG. 1 there is level 1 prefetcher circuitry 30 provided in association with the level 1 cache 15 and separate level 2 prefetcher circuitry 35 associated with the level 2 cache 20. The level 1 prefetcher circuit 30 may monitor the requests being issued by the processor pipeline 10 in order to seek to detect patterns of accesses, and hence predict which data may be requested by future accesses. It can then perform a lookup within the level 1 cache to see if such predicted data is already present in the cache, and if not can initiate an allocation operation to cause the data to be retrieved from a lower level of cache such as the level 2 cache 20, or from any further levels of cache/main memory 25.

Similarly, the level 2 prefetch circuitry 35 may monitor the requests propagated onto the level 2 cache 20 from the level 1 cache 15, and again seek to predict which data will be the subject of future requests. It can then perform lookups within the level 2 cache 20 to determine if the data is already present in the level 2 cache, and if not can initiate an allocation operation to cause the data to be retrieved into the level 2 cache.

As also shown in FIG. 1, a store buffer 40 may be provided for storing data produced by the processor pipeline 10, that can be stored directly to the level 2 cache 20 in this example implementation. Typically, when a write is performed into a cache, an entire cache line's worth of data is stored within the cache. Hence, if a write request issued by the processor pipeline relates to a subset of the data in a cache line, the cache processing that write request will typically retrieve an entire cache line's worth of data into the cache, and then modify the contents of that cache line using the write data output by the processor pipeline. Such an operation may typically be performed by the level 1 cache 15 in situations where the processor pipeline outputs data for a subset of a cache line. However, if the processor pipeline 10 actually produces write data for an entire cache line, there is no need to retrieve into the level 1 cache the previous data, and instead the data can be allocated directly into the cache with that data being marked as valid and dirty, to indicate that the contents of that cache line are more up to date than the version held in memory. In such instances, it may be decided to write the data directly to the level 2 cache 20, bypassing the level 1 cache 15, and in such instances the store buffer 40 can be used to store such write requests issued by the processor pipeline 10, with those write requests identifying an entire cache line's worth of data to be written when processing that request.

Each of the caches may comprise a set of resources that will be accessed in response to requests that are received by that cache. Arbitration circuitry will be provided in association with the cache to arbitrate amongst multiple requests received by the cache and, as discussed earlier, in one example implementation the arbitration circuitry can be arranged to employ a bandwidth aware arbitration scheme. In some implementations the arbitration circuitry may always employ such a bandwidth aware arbitration scheme, whilst in other implementations it may selectively switch between such a bandwidth aware arbitration scheme and a default arbitration scheme, such as a latency aware arbitration scheme. Whilst the techniques described herein can in principle be employed in association with any level of cache, for the purposes of the following discussion it will be assumed that such techniques are employed in association with the level 2 cache 20 shown in FIG. 1.

Figure 2:
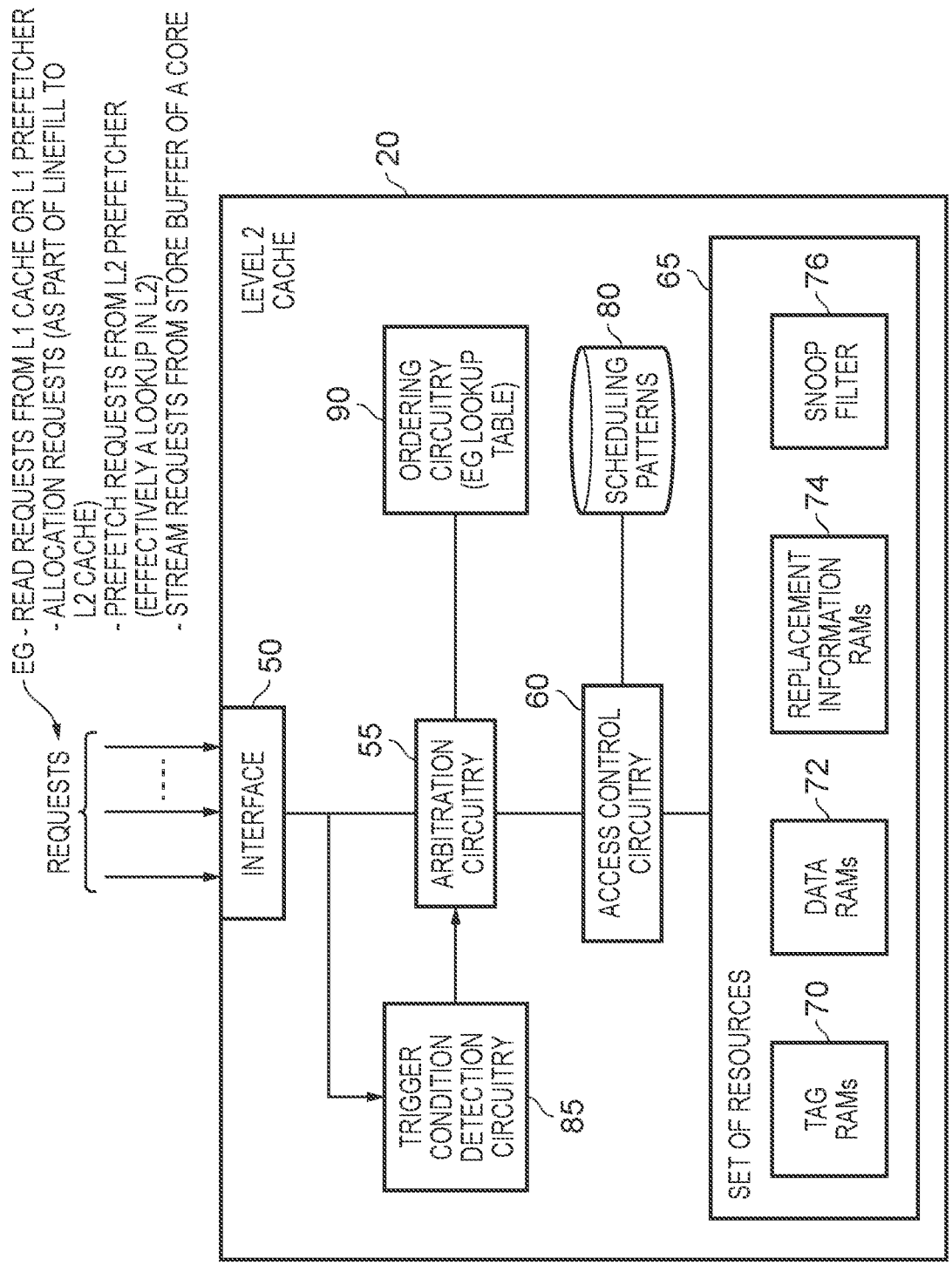
FIG. 2 is a block diagram illustrating in more detail components provided within the level 2 cache of FIG. 1 in accordance with one example arrangement.

FIG. 2 is a block diagram illustrating components that may be provided within the level 2 cache 20 in accordance with one example implementation. As shown in FIG. 2, the level 2 cache 20 includes a set of resources 65. In this particular example implementation the set of resources include tag RAMs (Random Access Memories) 70 and associated data RAMs 72. As will be understood by those skilled in the art, the cache may be organised in a variety of ways, but for the purposes of the description herein it will be assumed that the level 2 cache is a set associative cache, where separate tag RAMs will be provided for each of the ways within the set associative cache, and separate data RAMs will also be provided for each of the ways. Each tag RAM entry is used to store a tag portion of an address used to identify the location in memory associated with the data values stored in the corresponding cache line within one of the data RAMs 72. When detecting whether the data being requested by a particular request is present within the cache, then a tag portion of the address specified by that request is compared with the tag portion stored within a number of the tag RAM entries (in the above set associative example those tag RAM entries will include one entry in each of the ways, those entries collectively being referred to as a set, and being identified by an index portion of the address). In the event of a hit, then the associated data can be accessed within the corresponding cache line of the data RAMs 72. Each tag RAM entry way also include additional information, such as a valid bit to identify whether the corresponding cache line stores valid data, and a dirty bit to identify whether the data stored in the corresponding cache line is more up to date than the version held in memory.

When allocating new data into the cache, it is typically necessary to identify a victim cache line whose contents will be evicted from the cache, and as shown in FIG. 2 the set of resources 65 may include a replacement information storage comprising one or more replacement information RAMs 74. In particular, the replacement information RAMs 74 may store information associated with each of the cache lines for use in selecting a victim cache line. For example, when using a least recently used policy, the replacement information RAMs may indicate, for each cache line, when that cache line was last accessed.

In addition, the set of resources 65 may include a snoop filter circuit 76 that can be used to decide when the level 1 cache 15 needs to be subjected to a snoop operation. In particular, in one example implementation the level 1 cache is a virtually indexed physically tagged (VIPT) cache. This means that when a lookup is performed within the level 1 cache, the lookup is performed entirely using an index generated from virtual address bits of the virtual address used by the processor pipeline 10. However, one of more of those virtual address bits will be translated into corresponding physical address bits and hence those corresponding physical address bits may in fact differ in value from the virtual address bits when the final physical address is determined. However, for speed reasons, the lookup in the level 1 cache is performed before the physical address bits are available, and accordingly it is possible that the lookup performed using the virtual index bits may identify the wrong set within the level 1 cache, and conclude that the data is not stored in the level 1 cache when in fact it is. This results in a request being emanated from the level 1 cache to the level 2 cache, and by that stage the full physical address will be available.

Since allocations into the level 1 cache use data provided from the level 2 cache, the snoop filter 76 can be populated to identify the physical addresses of data that is stored in the level 1 cache. Accordingly, based on the address specified by a request from the level 1 cache, the snoop filter can be accessed in order to determine whether in fact the data at that physical address is stored in the level 1 cache. If it is, then a snoop request can be issued back to the level 1 cache using the physical address information in order to perform a lookup within the relevant set in order to access the data required. In one particular example implementation, the level 1 cache may then invalidate the currently accessed cache line entry and return the data to the level 2 cache, whereafter the level 2 cache may trigger a reallocation of the data into the level 1 cache within the set that was identified by the original virtual address, thereby ensuring that any subsequent request for that data using the same virtual address will result in a hit in the level 1 cache.

It will be appreciated that the use of snoop filter circuits 76 is not restricted to situations where a level 1 cache uses a VIPT arrangement. For example, in a multiprocessor system, each of the multiple different processor pipelines may have local dedicated level 1 caches, but share a lower level cache such as a level 2 cache, and the snoop filter circuitry may in that instance be used to identify when data that has missed in the level 1 cache of a requesting processor is in fact resident within a local level 1 cache of another processor, with a snoop request then being used to obtain that data from the other level 1 cache in order to service the original request.

As shown in FIG. 2, an interface 50 within the level 2 cache 20 may be arranged to receive requests from a variety of sources within the system. For instance, the interface 50 may receive read requests from the level 1 cache 15 or the level 1 prefetcher circuit 30 (in one example implementation the requests from the prefetcher 30 being routed via the level 1 cache 15). Additionally, the level 2 cache may receive allocation requests to allocate data into its data RAMs 72, for example as part of a linefill operation being performed in respect of the level 2 cache, in which case the data to be allocated may be provided by the further levels of cache/main memory 25.

As another example of a type of request that may be received, the level 2 cache 20 may receive prefetch requests from the level 2 prefetch circuitry 35. In one example, such prefetch requests require a lookup to be performed within the level 2 cache 20 in order to determine whether the data identified by the prefetch request is already resident within the level 2 cache or not.

As a yet further example of a type of request that may be received, then a stream request may be received from the store buffer 40 identifying an entire cache line's worth of data to be written into the level 2 cache.

At any point in time, there may be more than one active request presented to the interface 50, and in that event the arbitration circuitry 55 is used to arbitrate amongst the various requests in order to select, in a current arbitration cycle, at least one request to be processed. Whilst in some implementations the level 2 cache 20 may be able to select more than one request in each arbitration cycle, for the purposes of the following description it will be assumed that a single request is selected in each arbitration cycle by the arbitration circuitry 55, based on a currently selected arbitration scheme.

The access control circuitry 60 is then arranged to process each request selected by the arbitration circuitry, so as to perform the access operation specified by that request.

In the implementations discussed herein, there will be a finite group of access operations, and hence each access operation specified by a request will be one of the access operations within that group of access operations. Further, each access operation has an associated scheduling pattern which can be identified in the scheduling patterns storage 80, the scheduling pattern identifying the timing of access to the various resources 70, 72, 74, 76 when performing that access operation.

FIGS. 3A to 3D illustrate such scheduling patterns for the earlier-mentioned read requests, allocation requests, stream requests and prefetch requests, respectively. As will be apparent from those figures, the scheduling patterns identify a series of clock cycles M1 through M8, where M1 represents the cycle in which the arbitration circuitry selects the corresponding request, and identifies in each clock cycle which of the resources 70, 72, 74, 76 are accessed, and whether the access performed is a read access or a write access. As will be seen, some of the scheduling patterns are relatively simple. For example, when handling a prefetch request from the level 2 prefetcher 35, all that is required is to perform a read access to the snoop filter 76 and to the tag RAMs 70, and those accesses can be performed in parallel in the second clock cycle M2. However, the other access operations have more complex scheduling patterns where different resources are accessed in different clock cycles.

For instance, purely by way of example considering the read request shown in FIG. 3A, then once the read request is selected by the arbitration circuitry 55 in cycle M1, the snoop filter 76, tag RAMs 70 and replacement information RAMs 74 will be subjected to a read operation in cycle M2. Hit/miss determination is then performed in cycle M3 based on the results of the read operations performed in cycle M2, and in the event of a hit it will then be necessary to read the data RAMs 72. As shown in FIG. 3A, this may take two clock cycles M4 and M5. Further, it is to be noted that those clock cycles M4 and M5 need to be reserved for reading of data from the data RAMs 72 before it is actually known whether there is a hit or a miss, i.e. the scheduling pattern shown in FIG. 3A is the same independent of whether there is a hit or a miss, and hence whilst in fact if there is a miss there will be no need to read the data RAMs in cycles M4 and M5, it is important that a conflicting access is not selected by the arbitration circuitry that would then also be seeking to access the data RAMs in the same clock cycles. As also shown in FIG. 3A, in cycle M5 write operations may need to be performed to the tag RAMs and the replacement information RAMs 74. With regard to the replacement information RAMs 74, the information stored therein may need to be updated to identify that that cache line has now been recently used, and with regard to the tag RAMs it may be necessary to update some of the status information stored in the tag RAMs. For example, it may be that as part of the read operation it is then necessary to invalidate the cache line, and accordingly the valid bit will need to be cleared.

With regard to the scheduling pattern for an allocation request, it can be seen that each of the four resources 70, 72, 74, 76 are accessed, and the time of access is spread out over multiple clock cycles. Similarly, with the stream request, there are read and write operations in respect of the resources that are performed in different clock cycles.

Often, the arbitration circuitry 55 is arranged to employ an arbitration scheme that is latency aware, and hence seeks to service higher priority requests before lower priority requests. In particular, the individual requests can have priorities associated therewith, and when multiple active requests are presented in the same cycle, the arbitration circuitry may be predisposed towards selecting the highest priority request. Whilst such an approach can be useful in many implementations, it can give rise to starvation, and/or quality of service (QoS) issues in some situations. Further, it does not lead to the most optimal use of the resources 65, since, having regard to the sequence of requests selected by the arbitration circuitry over multiple arbitration cycles, it can be the case that there are a significant number of wasted cycles where no new requests can be selected due to the fact that there would then be conflict for access to the various resources taking into account the scheduling patterns of the requests that have been recently selected by the arbitration circuitry 55, and hence are in the process of being processed by the access control circuitry 60. However, in accordance with the technique described herein, trigger condition detection circuitry 85 is arranged to monitor the requests being received by the interface 50 over a period of time, and seek to detect situations where the importance of efficient bandwidth utilisation of the various resources 65 is significant enough to warrant a change from the default arbitration scheme applied by the arbitration circuitry 55. At that point, the arbitration circuitry can be arranged to switch to a bandwidth aware arbitration scheme where the order in which the various requests are selected by the arbitration circuitry 55 aims to ensure increased overall throughput of requests, by selecting requests in an order that reduces the number of wasted cycles, whilst avoiding contention for access to any of the resources 70, 72, 74, 76 by the various selected requests.

In particular, ordering circuitry 90 is provided that is able to determine, for different combinations of requests, an associated ordering of those requests that takes into account the associated scheduling pattern of each access operation in the group.

When in the bandwidth aware arbitration scheme mode of operation, the arbitration circuitry 55 does not seek to monitor the active requests at the interface during each arbitration cycle and then select one of those requests, but instead is arranged to iteratively perform a multi-arbitration operation. At the start of the multi-arbitration operation, the arbitration circuitry 55 obtains a snapshot of all of the requests that are active at the interface 50 at that point in time. It then employs the ordering circuitry to determine, based on the sampled requests, an order in which the sampled requests should be selected. Then, over the coming arbitration cycles, it selects one of those requests each arbitration cycle using the ordering information obtained from the ordering circuitry, until all of those sampled requests have been selected. Only at that point is reference again made to the interface 50, and in particular the multi-arbitration operation is then reperformed, whereupon a snapshot of the next active requests presented at the interface is taken, and the above process is repeated.

Since there is a finite number of options for the requests that may be asserted at the interface at any particular point in time, the ordering circuitry 90 can determine an optimal ordering for each such possible combination of requests, based on knowledge of the scheduling patterns for each of the access operations (for example based on the scheduling patterns shown in FIGS. 3A to 3D for the specific example discussed herein). The ordering circuitry 90 can be arranged to determine the optimal ordering on the fly based on information received from the arbitration circuitry about the sampled requests at the start of the multi-arbitration operation. However, alternatively that analysis can be performed offline in which case the ordering circuitry can be implemented as a lookup table, with the information about the active requests sampled at the beginning of the multi-arbitration operation being used to generate an index into a particular entry of the lookup table, with that entry then identifying the required ordering amongst those requests.

As will be discussed in more detail later, in addition to the requests sampled at the beginning of the multi-arbitration operation, the arbitration circuitry may also take into account a number of requests that have been selected during a predetermined number of previous arbitration cycles, since it will be appreciated for example from the scheduling patterns shown in FIGS. 3A to 3D that it is also possible that already selected requests that are already being processed by the access control circuitry 60 could also lead to some contention for access to the resources due to the number of clock cycles taken to process those requests. However, again there is only a finite number of options with regard to the different combinations of requests that may be presented to the interface, and the different combinations of inflight requests that may be being processed by the access control circuitry 60 and that have the potential for giving rise to contention for access to the resources. Accordingly the ordering circuitry 90 can readily determine for each possible combination the most optimal ordering of the requests presented at the interface. It has been found that the optimal scheduling for a given set of requests can be readily solved offline, when provided with information about the scheduling patterns required for each such request, and for example a python script may be written in order to optimise the scheduling so as to reach the maximum possible bandwidth for a particular set of requests.

Figure 4:
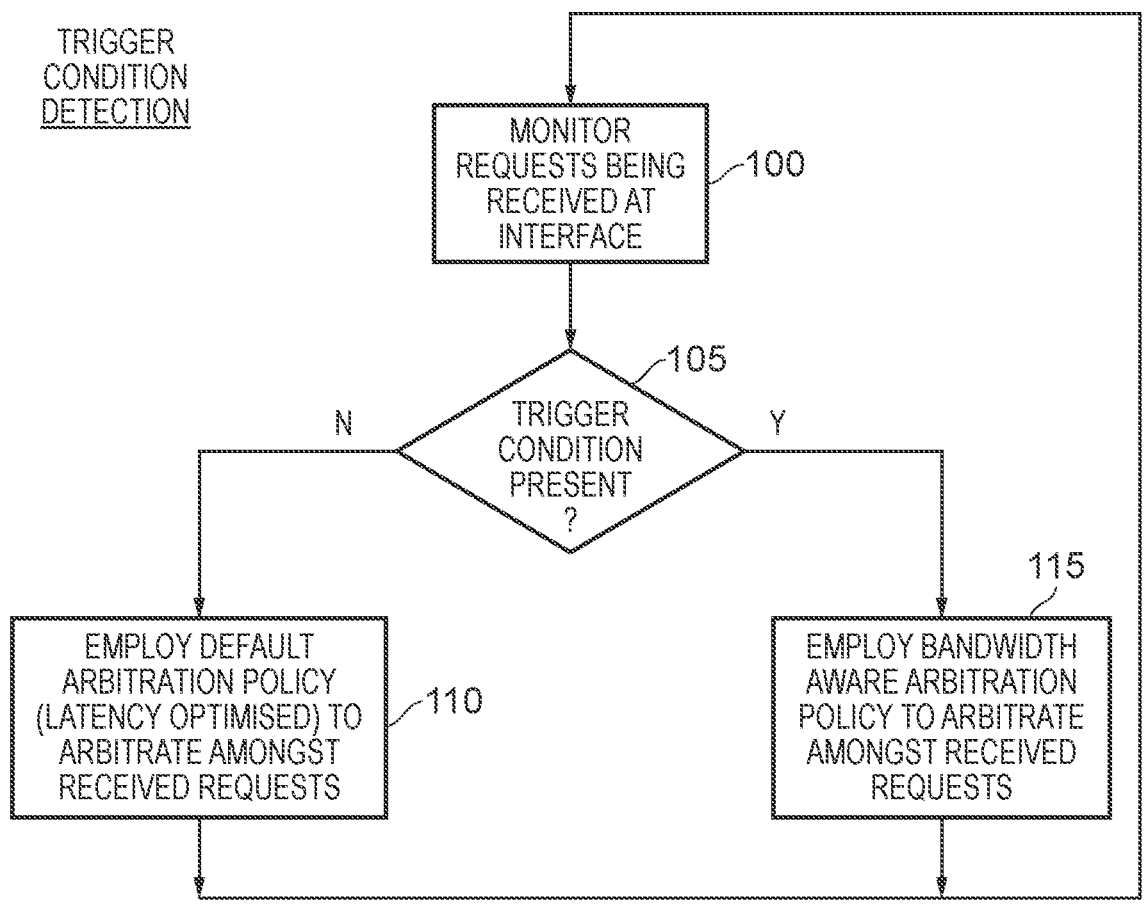
FIG. 4 is a flow diagram illustrating the operation of the trigger condition detection circuitry of FIG. 2 in accordance with one example implementation.

FIG. 4 is a flow diagram illustrating the operation of the trigger condition detection circuitry 85 of FIG. 2 in one example implementation. At step 100, the requests being received at the interface 50 are monitored, and at step 105 it is determined whether the trigger condition is present. If not, then at step 110 the arbitration circuitry 55 is arranged to employ a default arbitration policy to arbitrate amongst the received requests, and this may for example be a latency optimised arbitration scheme. Typically, in accordance with such an arbitration scheme, during each arbitration cycle the arbitration circuitry will look at the active requests asserted at the interface in that arbitration cycle and then select one of those requests as dictated by the arbitration scheme, for example selecting the highest priority request.

However, if the trigger condition is present, then instead at step 115 the arbitration circuitry 55 employs a bandwidth aware arbitration policy to arbitrate amongst the received requests. As discussed earlier, this involves taking a snapshot of the requests presented at the interface at a particular point in time, and then determining an optimal order in which to select those requests. Thereafter, in each arbitration cycle, one of those requests is selected until all of those requests have been selected in accordance with the determined order. Only thereafter are the requests at the interface resampled.

Figure 5:
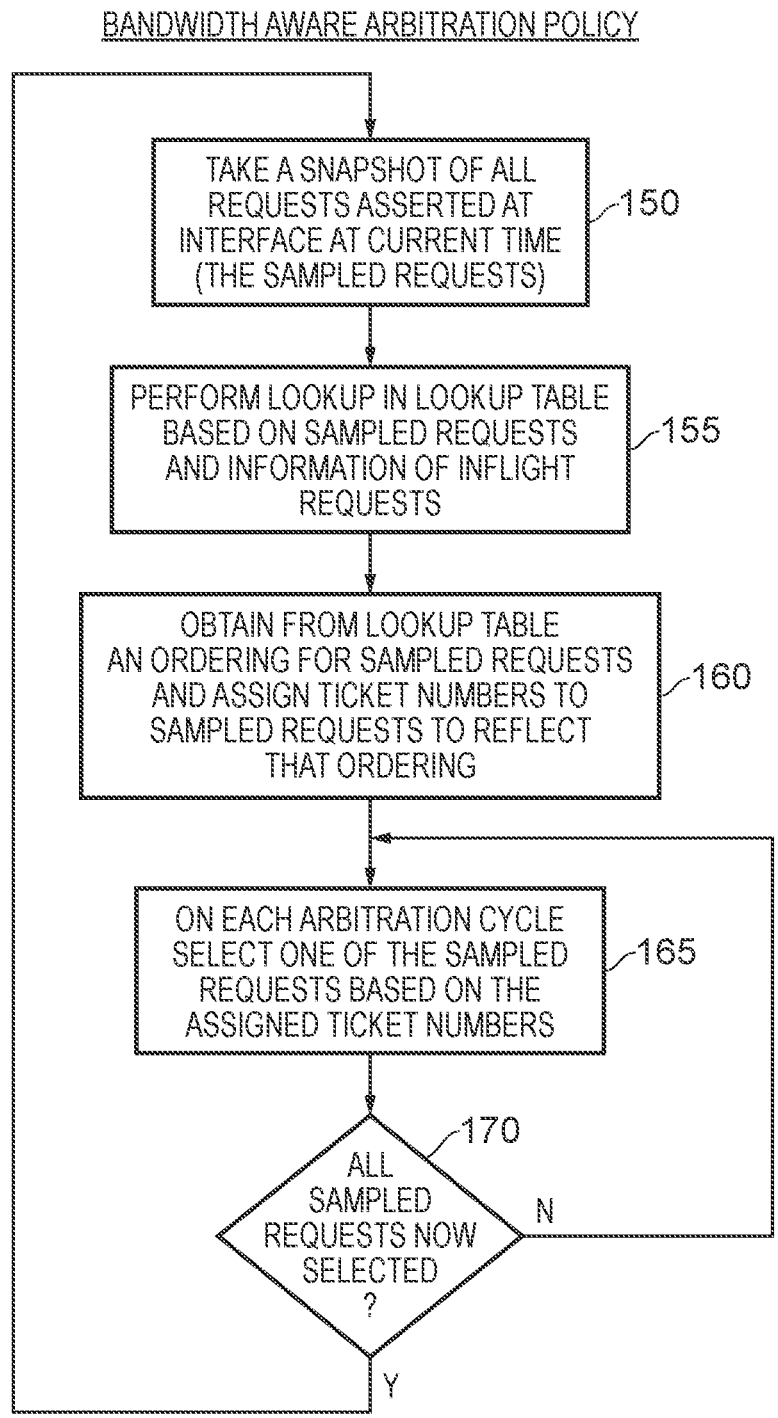
FIG. 5 is a flow diagram illustrating the steps performed when implementing a bandwidth aware arbitration policy in accordance with one example arrangement.

FIG. 5 is a flow diagram illustrating in more detail the bandwidth aware arbitration policy that may be employed in one example implementation. At step 150 a snapshot is taken of all of the requests asserted at the interface 50 at the current time, these being referred to as the sampled requests. Thereafter, at step 155 a lookup is performed in the lookup table 90 based on the sampled requests and information of one or more inflight requests. With regards to the inflight requests, it has been found that it is merely necessary for the arbitration circuitry to identify, when performing the lookup in the lookup table 90, the requests that have been selected in a predetermined number of preceding arbitration cycles, since the potential for those previously selected requests to cause contention with the requests that now need to be arbitrated amongst (i.e. the newly sampled requests) disappears after a certain number of clock cycles have elapsed. Further, it will be understood that certain types of previously selected requests are more likely to give rise to contention issues than other. For example, referring to the earlier-mentioned FIG. 3A to 3D, it will be appreciated that a previously selected allocation request is the request most likely to give rise to contention when selecting the ordering in which the sampled requests should be selected.

In one specific example, the arbitration circuitry may merely consider the requests selected in the preceding X arbitration cycles, and then will generate an index into the lookup table 90 based on the requests selected in those preceding X arbitration cycles and the sampled requests. The lookup table can then be arranged to provide a unique entry for each possible combination of sampled requests and previously selected requests, with the entry in the lookup table identified by the index then providing the optimal ordering for the sampled requests in that particular instance.

Hence, as indicated by step 160 of FIG. 5, the arbitration circuitry 55 obtains from the lookup table an ordering for the sampled requests, and then in one example implementation assigns ticket numbers to those sampled requests to reflect the ordering identified by the lookup table. Thereafter, at step 165 one of the sampled requests is selected based on the assigned ticket numbers, and at step 170 it is determined whether all sampled requests have now been selected. If not, the process returns to step 165 so that another sampled request is selected in the next arbitration cycle. Once all of the sampled requests have been selected, the process then returns to step 150 to start the next iteration of the multi-arbitration operation.

Figure 6:
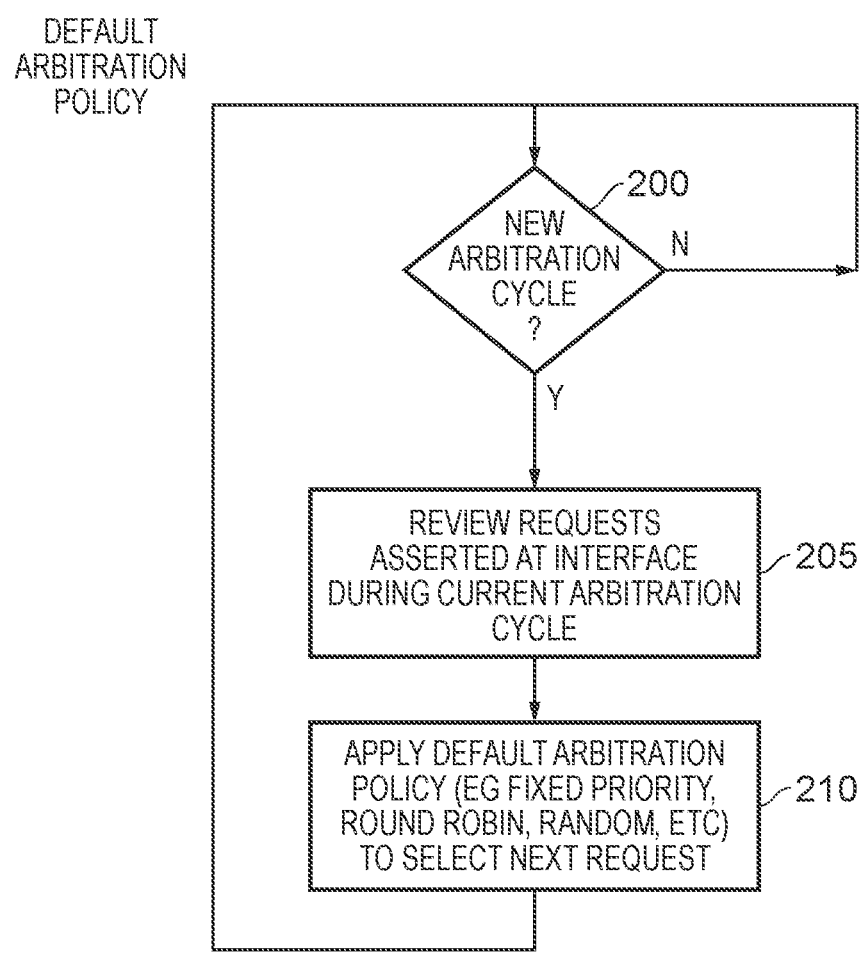
FIG. 6 is a flow diagram illustrating steps performed when implementing a default arbitration policy in accordance with one example arrangement.

FIG. 6 is a flow diagram illustrating an example of the default arbitration policy that may be applied by the arbitration circuitry 55 in the absence of the trigger condition. When a new arbitration cycle 200 is detected, then the arbitration circuitry reviews, at step 205, the requests currently presented to the interface 50. It then applies the default arbitration policy in order to select one of those requests, which is then output to the access control circuitry 60, as indicated by step 210. The default arbitration policy can take a variety of forms. For example it could be a fixed priority policy, a round robin policy, a random policy, etc.

Figure 7:
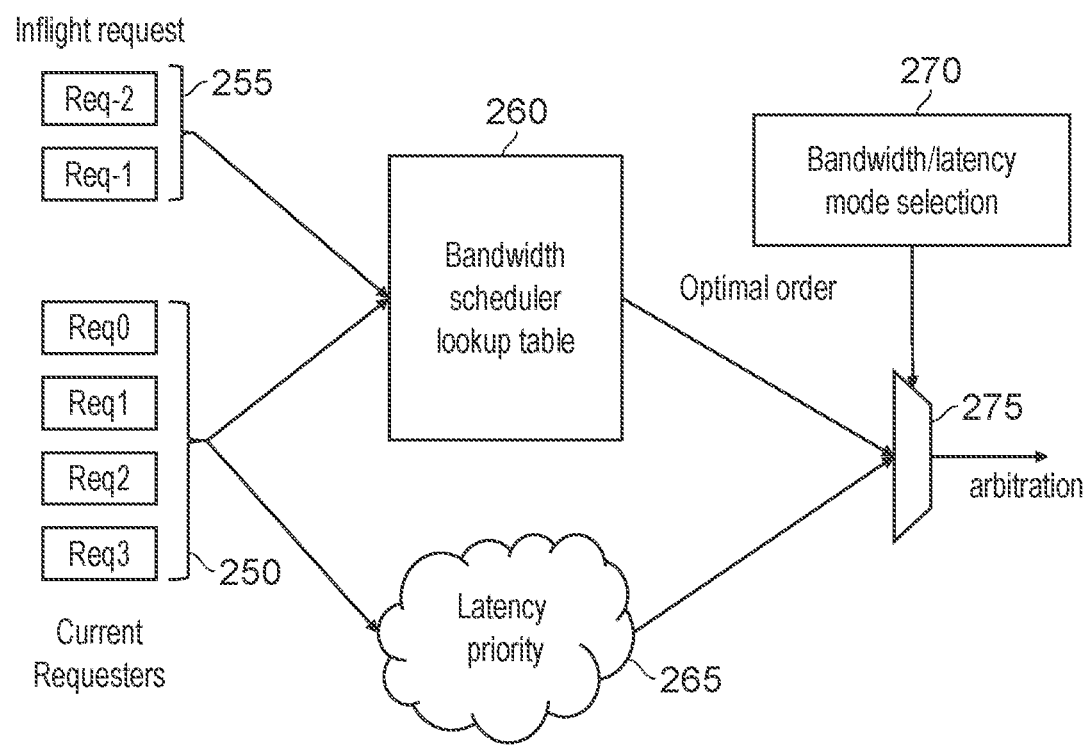
FIG. 7 schematically illustrates how the level 2 cache shown in FIG. 2 may switch between a bandwidth aware and a latency aware mode of operation when performing arbitration of incoming requests, in accordance with one example arrangement.

FIG. 7 schematically illustrates the mechanism employed in one example implementation for switching between bandwidth aware and latency aware arbitration schemes. When adopting the bandwidth aware scheme, a bandwidth scheduler lookup table mechanism 260 is employed taking into account the current requests 250 and one more inflight requests 255, this resulting in the determination of an optimal order for improving overall bandwidth. However, if a latency priority scheme 265 is employed, then merely the current requests 250 for a current arbitration cycle are considered, and one request is selected. Further, bandwidth/latency mode selection 270 is performed by the trigger condition detection circuitry 85 in order to determine whether the order is dictated by that provided by the lookup table, or merely chosen in accordance with the latency priority scheme 265.

FIGS. 8A and 8B show an example of scheduling that may be performed by the arbitration circuitry 55 when using the default arbitration scheme (as shown in FIG. 8A) or when using the bandwidth optimised scheduling afforded by employing the bandwidth aware arbitration scheme (FIG. 8B). In this example, it is assumed that 5 requests are presented to the interface, namely a read snoop request, a prefetch request, a stream lookup request, an allocation request and another prefetch request. This is an example of a sequence of requests that may be used often in memory copy (memcopy) operations, which as discussed earlier are an example of a type of workload where it is beneficial to maximise bandwidth. It should also be noted that if the requests are presented to the interface at the same time, this means that any required hazard checking has been passed, and accordingly all of those requests may be performed in any order. In particular, the interface will not receive at the same time two asserted requests if there is any ordering constraint requirement between those requests.

As shown in FIG. 8A, when adopting a random scheduling scheme, the 5 requests may be processed over 11 cycles, with there being 6 wasted cycles where no requests are allocated, namely cycles 2, 4, 5, 7, 9 and 11. However, when performing the optimised scheduling, the same sequence of 5 requests can be processed over 9 cycles, with only 4 wasted cycles (namely cycles 4, 6, 8 and 9).

Figure 9A:
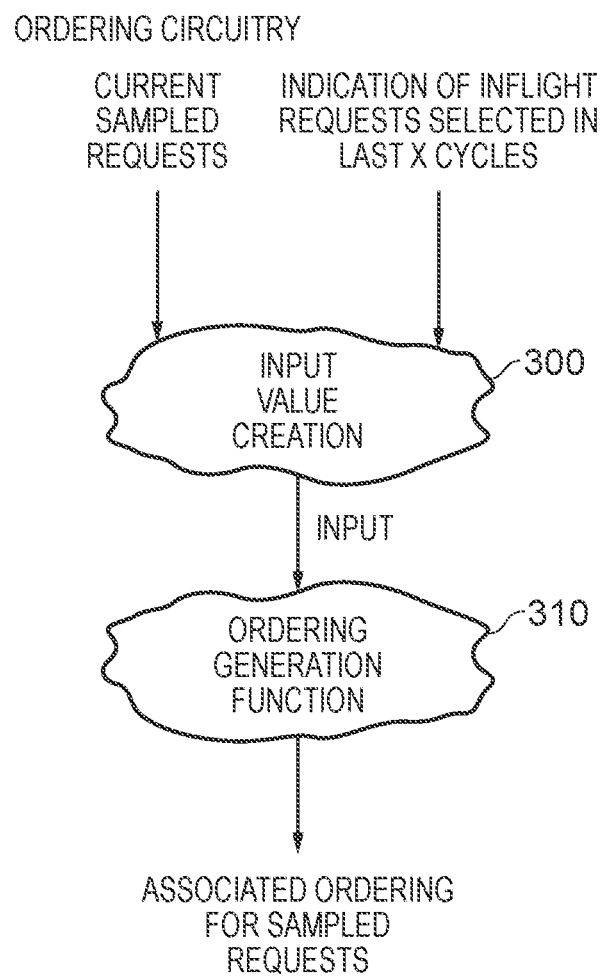
FIG. 9A is a diagram schematically illustrating the operation of the ordering circuitry of FIG. 2.

FIG. 9A schematically illustrates logic that may be used to implement the ordering circuitry 90 of FIG. 2. Input valuation creation logic 300 may be provided that receives an indication of the currently sampled requests and an indication of the inflight requests selected in the last X cycles. Based on that provided information, an input value may be generated that is then input to the ordering generation function 310. For each unique input value, the ordering generation function can generate an associated ordering for the sampled requests, and that associated ordering can then be provided back to the arbitration circuitry.

Figure 9B:
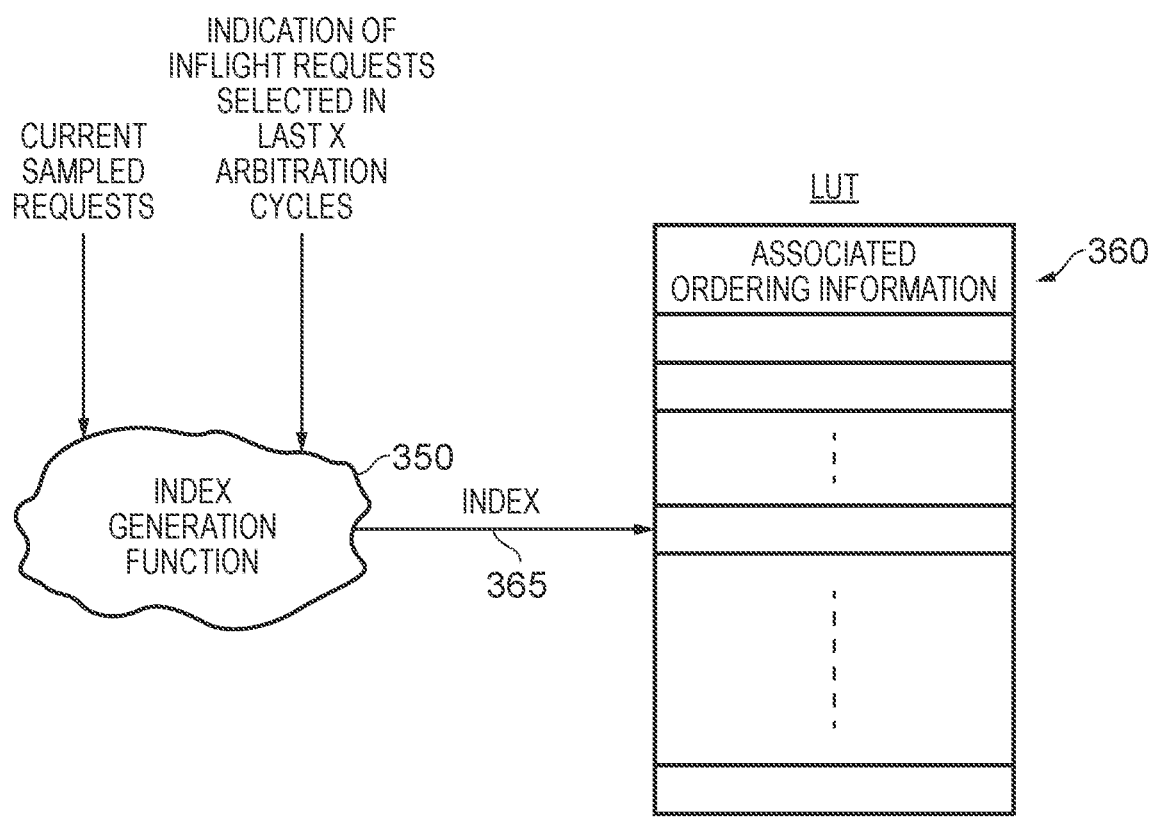
FIG. 9B illustrates the operation of the ordering circuitry of FIG. 2 in the example where the ordering circuitry is implemented as a lookup table.

Whilst the ordering circuitry may incorporate logic that generates the ordering information on the fly as per the example of FIG. 9A, the process lends itself to offline generation of the ordering information, since there is a finite number of different combinations of sampled requests and inflight requests. Accordingly, as shown in FIG. 9B, in an alternative implementation a lookup table 360 can be provided that has an entry for each possible combination of sampled requests and inflight requests, and identifies in the entry the optimal ordering to be used in that situation. Then, an index generation function 350 can be provided that, based on the currently sampled requests and the indication of the inflight requests selected in the last X arbitration cycles, generates an index value 365 used to identify a particular entry in the lookup table 360. The contents of that entry are then returned to the arbitration circuitry to identify the ordering in which the sampled requests should be selected.

Figure 10:
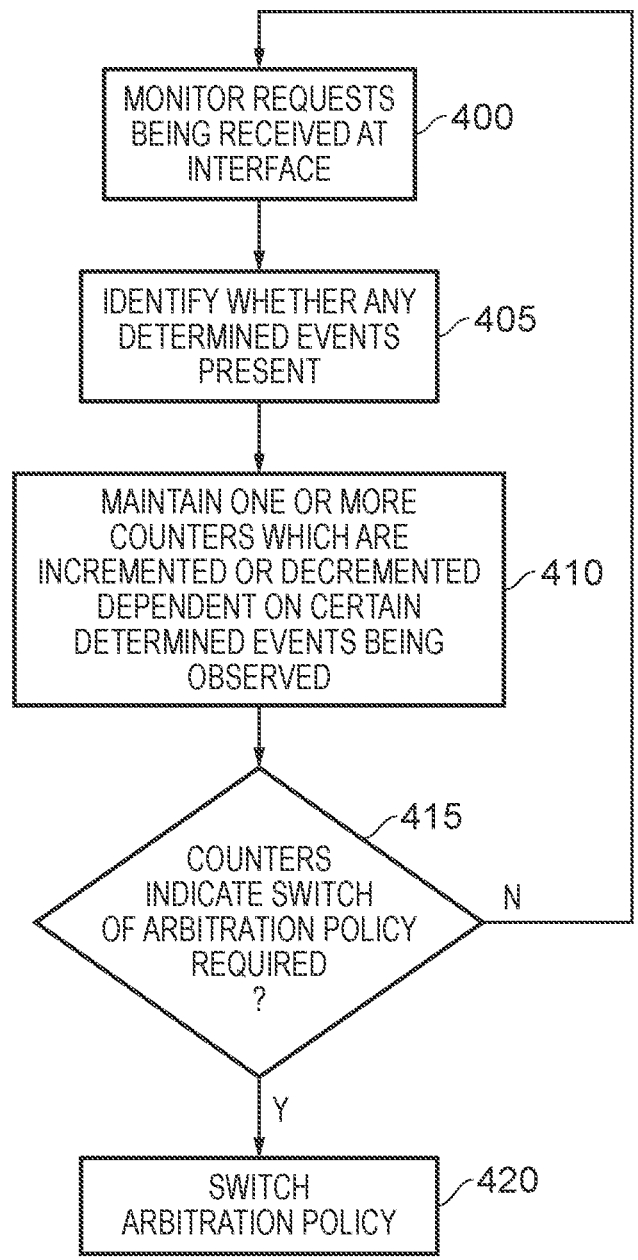
FIG. 10 is a flow diagram illustrating steps that may be performed by the trigger condition detection circuitry in order to determine when a switch in arbitration policy is to be performed, in accordance with one example arrangement.

FIG. 10 is a flow diagram illustrating in more detail the operation of the trigger condition detection circuitry 85 of FIG. 2. At step 400, the requests being received at the interface are monitored, and then at step 405 it is identified whether any determined events are present. In particular, there may be a predetermined set of events that the trigger condition detection circuitry is seeking to identify the presence of. At step 410, one or more counters may be maintained which are incremented or decremented dependent on the certain determined events being observed. Then, at step 415, it is determined whether the value of those counters indicate that a switch of arbitration policy is required, and if not the process returns to step 400. However, whenever the counters indicate that a switch is required, the process may proceed to step 420 where the arbitration policy is switched.

Figure 11A:
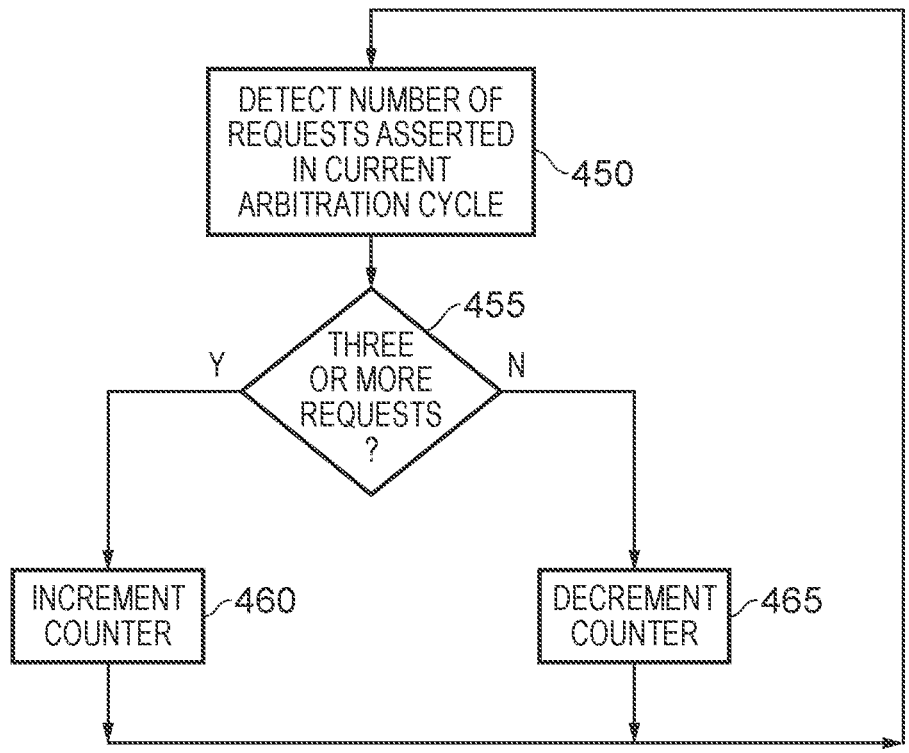
FIG. 11A is a flow diagram illustrating steps that may be performed in order to maintain a counter referenced by the trigger condition detection circuitry, in accordance with one example arrangement.

The counters can take a variety of forms, but one particular example is illustrated with reference to FIGS. 11A and 11B. As shown in FIG. 11A, at step 450 the trigger condition detection circuitry 85 detects the number of requests asserted in the current arbitration cycle. It is then determined at step 455 whether there are three or more requests being asserted in the current arbitration cycle. If so, then this can be considered to be one of the earlier-mentioned determined events, and causes a counter to be incremented at step 460. In particular, as the number of requests asserted in each arbitration cycle increases, this will tend to indicate that the processing of the requests is likely to become bandwidth constrained, and that accordingly it may be more appropriate to switch to the bandwidth aware arbitration scheme in order to seek to optimise bandwidth utilisation within the level 2 cache. However, if there are not three or more requests, then instead the counter may be decremented at step 465.

Figure 11B:
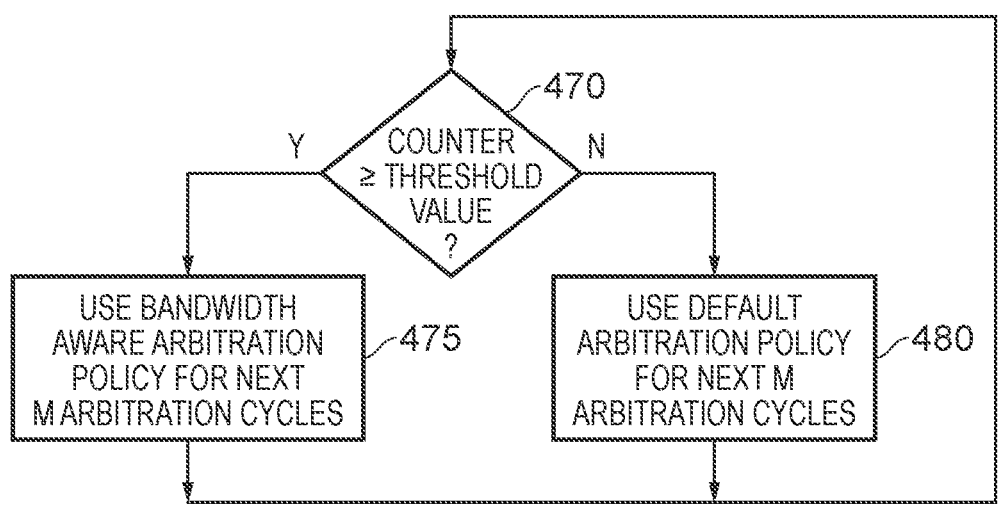
FIG. 11B is a flow diagram illustrating how the trigger condition detection circuitry may determine how to switch between different arbitration policies dependent on the value of the counter, in accordance with one example arrangement.

As shown in FIG. 11B, the arbitration circuitry 55 may be arranged to determine whether the counter is greater than or equal to a threshold value at step 470. If it is, then the arbitration circuitry may be arranged to use the bandwidth aware arbitration policy for the next M arbitration cycles. However, if the counter is not greater than or equal to the threshold value, then at step 480 the arbitration circuitry may instead use the default arbitration policy for the next M arbitration cycles. In theory, the process shown in FIG. 11B could be performed every arbitration cycle, but this might potentially cause thrashing between different arbitration schemes, and accordingly as shown in FIG. 11B it may be decided to only analyse the contents of the counter every M arbitration cycles, thereby ensuring that for at least M arbitration cycles the arbitration scheme remains the same.

Whilst FIGS. 11A and 11B show a relatively simple example where the counter is incremented or decremented dependent on the number of asserted requests in a current arbitration cycle, it will be appreciated that other counters could be maintained, either instead of, or in addition to, the counter discussed with reference to FIGS. 11A and 11B. For example, there may be particular patterns of access requests that are considered to be indicative of a workload where bandwidth is important, and hence each time such a pattern is observed a counter may be incremented, whereas each time that pattern is not observed a counter may be decremented. Thus, if a particular pattern of accesses is repeatedly seen a number of times, this could cause a trigger to transition to the bandwidth aware arbitration scheme. Such an approach could for example be used to identify occurrences of the earlier discussed memcopy operation where a given sequence of requests is repetitively seen at the interface.

Figure 12:
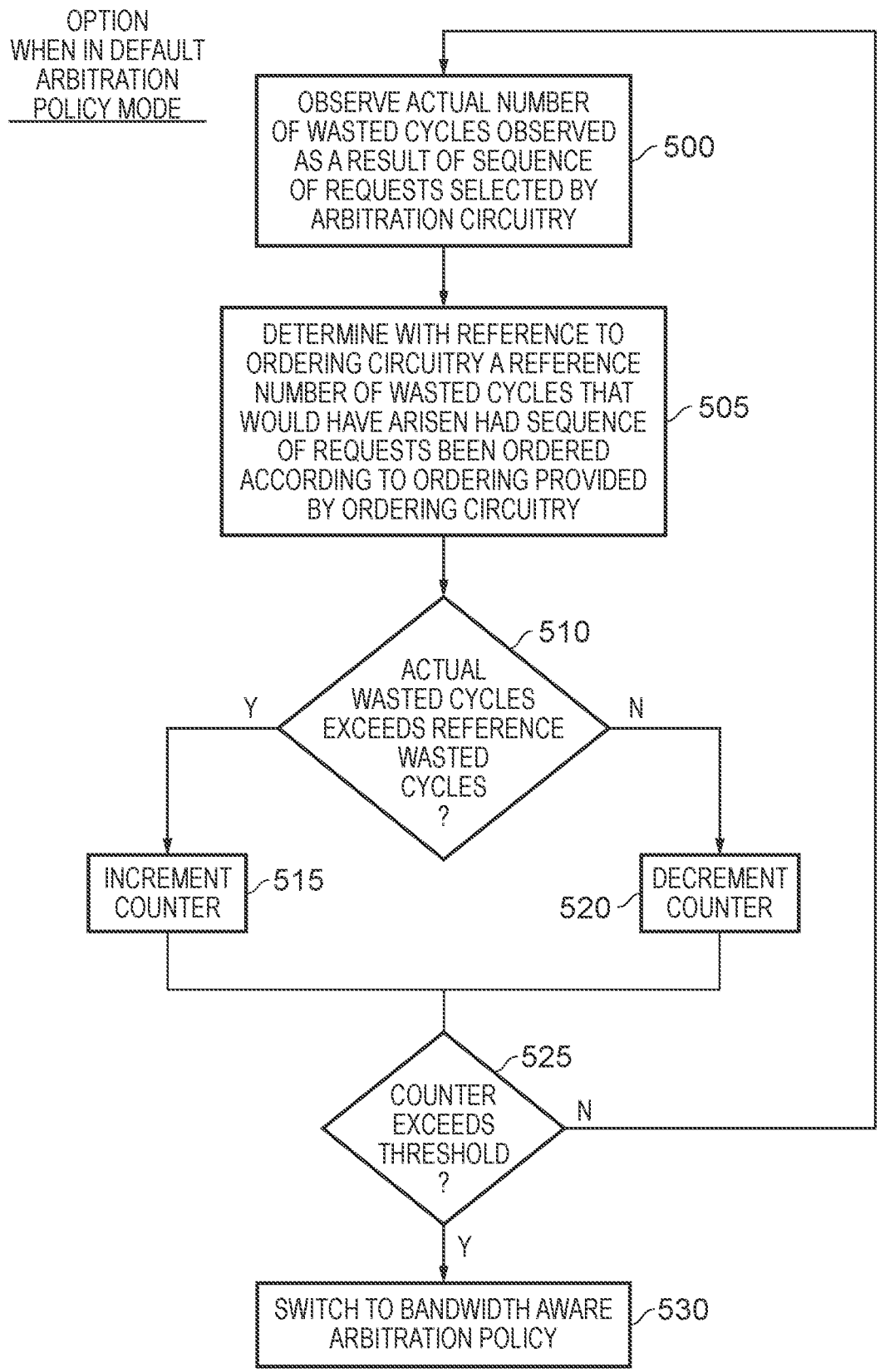
FIG. 12 is a flow diagram illustrating another technique that may be adopted by the trigger condition detection circuitry in order to determine when to switch to the bandwidth aware arbitration policy.

FIG. 12 is a flow diagram illustrating a further technique that may be used to trigger a switch to the bandwidth aware arbitration policy in situations where the arbitration circuitry 55 is currently operating using the default arbitration policy. In one example implementation, when the arbitration circuitry is using the default arbitration policy, the ordering circuitry 90 is not used. However, in accordance with the technique of FIG. 12 the ordering circuitry 90 could still be referred to in order to obtain comparison data. In particular, as shown in FIG. 12, at step 500 the arbitration circuitry can keep track of the actual number of wasted cycles observed as a result of a sequence of requests selected by the arbitration circuitry. In particular, it could maintain such information in situations where the sequence of requests that are selected are a sequence of requests that were all asserted together at a preceding point in time, and hence could have been a candidate for a sampled sequence of requests obtained by the arbitration circuitry if the arbitration circuitry had been operating using the bandwidth aware arbitration scheme.

Then, at step 505 the arbitration circuitry references the ordering circuitry 90 in order to obtain a reference number of wasted cycles that would have arisen had the sequence of requests been ordered according to the ordering provided by the ordering circuitry. Then, at step 510 it can be determined whether the actual wasted cycles exceeds the reference wasted cycles, and if so a counter can be incremented at step 515. However, if this is not the case then a counter may be decremented at step 520.

At step 525 it can be determined whether the counter exceeds a chosen threshold, and if not the process returns to step 500. However, if the counter does exceed the threshold, then this can cause a switch to the bandwidth aware arbitration policy at step 530.

The approach shown in FIG. 12 could be used continuously, so that the arbitration circuitry continuously monitors the requests and references the ordering circuitry as and when appropriate to obtain a reference number of wasted cycles. Alternatively, the arbitration circuitry 55 could be used to just reference the ordering circuitry 90 at discrete points in time, rather than on a continuous basis. In situations where an intervening request appears at the interface and is arbitrated before all of the sequence of requests that were previously presented at the interface are arbitrated, then the monitoring functionality shown in FIG. 12 could merely be reset so that the arbitration circuitry 55 thereafter begins to observe the next set of requests presented at the interface. There is no need to reset the counter in such instances. However, it will be appreciated that as soon as such an intervening request is arbitrated, then there is no longer a suitable set of requests that can be used to perform a lookup within the ordering circuitry 90 in order to obtain a reference number of wasted cycles, and accordingly the monitoring process needs to be restarted.

The approach of FIG. 12 can be used instead of, or in combination with, any other counter based mechanism used by the trigger condition detection circuitry to determine when it is appropriate to switch between the different arbitration schemes. In situations where the approach of FIG. 12 is used, then if desired one or more of the sources of requests to the level 2 cache may be provided with the ability to assert a control signal in situations where it is considered appropriate by them to be using the latency aware arbitration scheme, and accordingly such a control signal can be used to trigger a switch back to the latency aware arbitration scheme in situations where the approach of FIG. 12 has at some point caused an earlier switch to the bandwidth aware arbitration scheme. Hence, one or more high priority requesters may be provided with the ability to assert such a control signal when those requesters believe that latency aware arbitration should be being employed. As a specific example, the level 1 cache 15 may have a load buffer to hold pending read requests to the level 2 cache 20. These pending read requests may be demand based (high priority) requests due to actual requests issued by the processor pipeline 10 or could be prefetch based (lower priority) requests due to the activities of the level 1 prefetcher 30. If the load buffer is getting low on entries, this may indicate that the load activity is not running sufficiently ahead of the processing demand, and hence latency may be becoming an issue. At that point, the level 1 cache could assert the control signal to cause the level 2 cache to operate in the latency aware arbitration mode. It should be noted at this point that the level 1 cache does not know which arbitration scheme the level 2 cache is currently using, but is merely indicating that latency arbitration should be used, and hence in situations where the level 2 cache receives such an asserted control signal, and is currently operating in the bandwidth aware arbitration scheme, that asserted control signal may cause the arbitration circuitry to switch back to the default, latency based, arbitration scheme.

Figure 13:
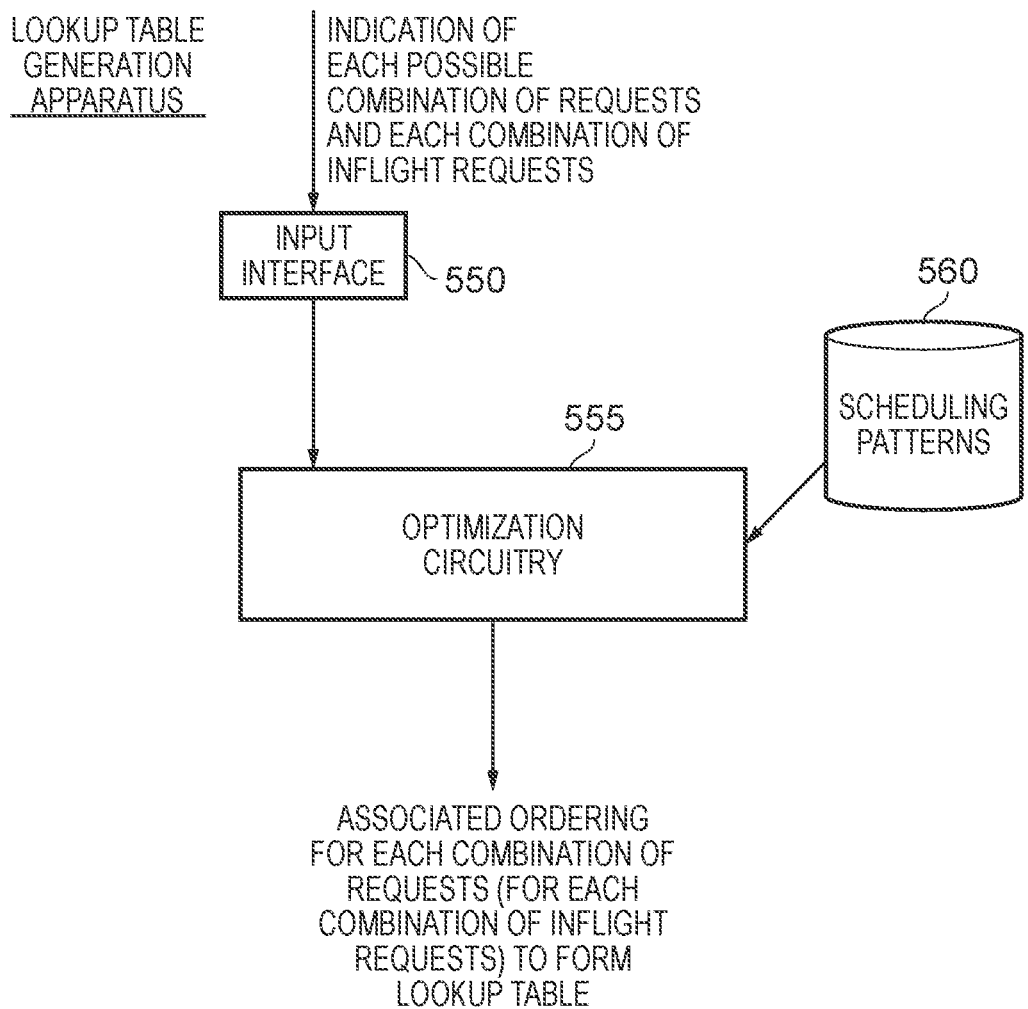
FIG. 13 is a diagram illustrating a lookup table generation apparatus in accordance with one example implementation.

As mentioned earlier, the ordering circuitry 90 can in one example be implemented by a lookup table whose contents are generated offline. FIG. 13 schematically illustrates a lookup table generation apparatus that may be used for that purpose. Such an apparatus may have access to storage 560 providing the scheduling patterns for all of the various access operations, and at the input interface 550 may receive an indication of each possible combination of requests and each possible combination of inflight requests. Optimisation circuitry 555 may then analyse each of the possible combinations, taking account of the scheduling patterns in the storage 560, in order to provide an associated ordering for each combination of requests (for each combination of inflight requests that may arise for that combination of requests), and populate that ordering information within a lookup table that can in due course be referenced by the arbitration circuitry.

The techniques described herein enable the implementation of a bandwidth aware arbitration scheme that can increase overall throughput within an apparatus having a set of resources that need to be accessed in response to requests, such as for example may be the case in association with a cache structure. When adopting such a scheme, this can simplify the timing issues and predominantly guarantee a fixed number of cycles for an operation to finish, thus avoiding starvation and/or QoS scenarios. In one example implementation, a mechanism can be used to enable selective switching to the bandwidth aware arbitration scheme from a default arbitration scheme such as a latency aware arbitration scheme, and such an approach can allow a hybrid bandwidth-latency arbitration for fixed scheduling schemes, i.e. where particular access operations have associated fixed scheduling patterns identifying the relative timing of access to the various resources within the set of resources.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
an interface to receive requests;
a set of resources to be accessed in response to the requests;
arbitration circuitry to arbitrate amongst the requests received at the interface in order to select, in each arbitration cycle, at least one next request to be processed, wherein each request identifies an access operation to be performed in response to the request, the access operation being selected from a group of access operations, and wherein each access operation in the group has an associated scheduling pattern identifying timing of access to the resources in the set when performing that access operation;
access control circuitry, responsive to a given request being selected by the arbitration circuitry, to control access to the set of resources in accordance with the associated scheduling pattern for the access operation identified by that given request; and
ordering circuitry to determine, for different combinations of requests, an associated ordering of those requests, where the associated ordering is determined taking into account the associated scheduling pattern of each access operation in the group;
wherein, at least in the presence of a trigger condition, the arbitration circuitry is arranged to employ a bandwidth aware arbitration scheme where the arbitration circuitry is arranged to iteratively perform a multi-arbitration operation, where each performance of the multi-arbitration operation comprises:
sampling the requests currently received at the interface;
employing the ordering circuitry to determine, based on the sampled requests, an order in which the sampled requests should be selected; and
during each arbitration cycle, selecting the at least one next request to be processed from amongst the sampled requests, based on the determined order, until each sampled request has been selected.

2. An apparatus as claimed in claim 1, wherein at least one of the access operations in the group takes multiple clock cycles to perform, and the associated scheduling pattern identifies, for each clock cycle in the multiple clock cycles, which resources in the set are accessed in that clock cycle when performing the access operation.

3. An apparatus as claimed in claim 1, wherein in an absence of the trigger condition the arbitration circuitry is arranged to employ a default arbitration scheme that, on each arbitration cycle, selects a request from amongst the requests currently received at the interface in that arbitration cycle.

4. An apparatus as claimed in claim 3, wherein the default arbitration scheme is arranged to take into account priority information associated with each request, in order to implement a latency aware arbitration scheme.

5. An apparatus as claimed in claim 1, wherein:
the ordering circuitry is arranged to determine, for a given combination of requests, an associated ordering of those requests that also takes into account one or more inflight requests recently selected by the arbitration circuitry; and
the arbitration circuitry is arranged, when performing the multi-arbitration operation, to provide the ordering circuitry with an indication of the sampled requests and of the one or more inflight requests recently selected by the arbitration circuitry, to enable the ordering circuitry to determine the order in which the sampled requests should be selected.

6. An apparatus as claimed in claim 5, wherein the ordering circuitry is arranged to take into account the one or more inflight requests by identifying each inflight request amongst said one or more inflight requests that, taking into account the time of that inflight request's selection and the associated scheduling pattern for the access operation identified by that inflight request, has the prospect of causing contention for access to the resources when taking into account the sampled requests, and to determine as the associated ordering an ordering amongst the sampled requests that avoids said contention.

7. An apparatus as claimed in claim 5, wherein the arbitration circuitry is arranged to provide the ordering circuitry with an indication of the one or more inflight requests selected by the arbitration circuitry in a predetermined number of preceding arbitration cycles.

8. An apparatus as claimed in claim 1, wherein the ordering circuitry is implemented as a lookup table.

9. An apparatus as claimed in claim 1, further comprising:
trigger condition detection circuitry to determine when the trigger condition is present, in dependence on monitoring of the requests being received at the interface over a period of time.

10. An apparatus as claimed in claim 9, wherein the trigger condition detection circuitry is arranged to maintain at least one counter whose value is adjusted based on occurrence of determined events detected by the monitoring of the requests being received at the interface.

11. An apparatus as claimed in claim 10, wherein the determined events comprises one or more events indicating that processing of the requests is likely to be bandwidth constrained.

12. An apparatus as claimed in claim 10, wherein at least one determined event is associated with observation of a predetermined pattern of requests.

13. An apparatus as claimed in claim 10, wherein:
the trigger condition detection circuitry is arranged to maintain a counter whose value is adjusted in a first direction when a number of requests received at the interface in a current arbitration cycle is greater than or equal to a predetermined number and is adjusted in a second direction opposite to the first direction when the number of requests received at the interface in the current arbitration cycle is less than the predetermined number; and
the trigger condition detection circuitry is arranged to detect presence of the trigger condition in dependence on whether the value of the counter is beyond a threshold value.

14. An apparatus as claimed in claim 10, wherein:
in the absence of the trigger condition being present, the trigger condition detection circuitry is arranged to monitor an actual number of wasted cycles observed as a result of a sequence of requests selected by the arbitration circuitry, to determine with reference to the ordering circuitry a reference number of wasted cycles that would have arisen had that sequence of requests been ordered according to the associated ordering output by the ordering circuitry, and to maintain a wasted cycles indication counter whose value is adjusted in a first direction when the actual number of wasted cycles exceeds the reference number of wasted cycles and is adjusted in a second direction opposite to the first direction when the actual number of wasted cycles is less than the reference number of wasted cycles; and
the trigger condition detection circuitry is arranged to detect presence of the trigger condition in dependence on whether the value of the wasted cycles indication counter is beyond a wasted cycles indication threshold value.

15. An apparatus as claimed in claim 1, wherein the set of resources are components provided within a cache storage.

16. An apparatus as claimed in claim 15, wherein the cache storage is provided within a cache hierarchy, and the requests are received from multiple different sources including at least one further cache storage at a higher level in the cache hierarchy.

17. An apparatus as claimed in claim 15, wherein the set of resources comprise at least a data storage comprising a plurality of cache lines used to store data values, and a tag storage comprising a plurality of entries, where each entry is used to store an address indication indicative of a common address portion for the data values stored in a corresponding cache line of the data storage.

18. An apparatus as claimed in claim 17, wherein the set of resources further comprise at least one of:
snoop circuitry used to process a snoop request to determine which caches within a cache hierarchy should be subjected to a snoop operation, the cache hierarchy including the cache storage; and
a replacement policy storage to identify, for each cache line, replacement information referenced during application of a replacement policy to select a cache line whose contents are to be evicted from the cache storage.

19. An apparatus as claimed in claim 1, wherein the arbitration circuitry is arranged, when performing the multi-arbitration operation, to allocate a ticket number to each sampled request to identify the determined order of the sampled requests, and during each arbitration cycle, to use the ticket number to select the at least one next request to be processed from amongst the sampled requests.

20. A lookup table generation apparatus to generate a lookup table for use as ordering circuitry within an apparatus as claimed in claim 1, comprising:
an input interface to receive at least an indication of each possible combination of requests that may be received at the same time by an apparatus as claimed in claim 1;

storage to identify an associated scheduling pattern for each access operation that may be identified by a request, wherein for each access operation the associated scheduling pattern identifies timing of access to resources in a set of resources provided by the apparatus as claimed in claim 1 when performing that access operation; and optimization circuitry to analyse each possible combination of requests, taking into account the associated scheduling patterns of the access operations identified by those requests, in order to determine an associated ordering of those requests to be identified in the lookup table.

21. An apparatus as claimed in claim 20, wherein:

the lookup table is arranged to provide, for each combination of requests, multiple associated orderings of those requests, where each associated ordering of those requests takes into account a different combination of inflight requests; and the optimization circuitry is arranged, when determining an associated ordering for a given combination of requests, to consider each inflight request that, taking into account a relative timing of that inflight request's selection and the associated scheduling pattern for the access operation identified by that inflight request, has the prospect of causing contention for access to the set of resources when taking into account the given combination of requests, the optimization circuitry being arranged to determine the associated ordering for the given combination of requests so as to avoid said contention.

22. A method of operating an apparatus to arbitrate access to a set of resources, comprising:

receiving at an interface requests for access to the set of resources;

employing arbitration circuitry to arbitrate amongst the requests received at the interface in order to select, in each arbitration cycle, at least one next request to be processed, wherein each request identifies an access operation to be performed in response to the request, the access operation being selected from a group of access operations, and wherein each access operation in the group has an associated scheduling pattern identifying timing of access to the resources in the set when performing that access operation;

controlling, responsive to a given request being selected by the arbitration circuitry, access to the set of resources in accordance with the associated scheduling pattern for the access operation identified by that given request; and employing ordering circuitry to determine, for different combinations of requests, an associated ordering of those requests, where the associated ordering is determined taking into account the associated scheduling pattern of each access operation in the group;

at least in the presence of a trigger condition, causing the arbitration circuitry to employ a bandwidth aware arbitration scheme where the arbitration circuitry is arranged to iteratively perform a multi-arbitration operation, where each performance of the multi-arbitration operation comprises:

sampling the requests currently received at the interface;

employing the ordering circuitry to determine, based on the sampled requests, an order in which the sampled requests should be selected; and during each arbitration cycle, selecting the at least one next request to be processed from amongst the sampled requests, based on the determined order, until each sampled request has been selected.

* * * * *